(12) United States Patent
Georgiades

(10) Patent No.: US 11,616,332 B2
(45) Date of Patent: Mar. 28, 2023

(54) PORTABLE CHARGER WITH INTERCHANGEABLE CONNECTORS

(71) Applicant: Molonlave Group LLC, Long Island City, NY (US)

(72) Inventor: Marios Georgiades, Saddle River, NJ (US)

(*) Notice: Subject to any disclaimer, the term of this patent is extended or adjusted under 35 U.S.C. 154(b) by 22 days.

(21) Appl. No.: 17/374,677

(22) Filed: Jul. 13, 2021

(65) Prior Publication Data
US 2022/0352681 A1    Nov. 3, 2022

Related U.S. Application Data

(60) Provisional application No. 63/182,347, filed on Apr. 30, 2021.

(51) Int. Cl.
| H01R 31/06 | (2006.01) |
| H02J 7/00 | (2006.01) |
| H01R 13/22 | (2006.01) |
| H01R 43/26 | (2006.01) |
| H01R 13/66 | (2006.01) |
| H02J 7/34 | (2006.01) |

(52) U.S. Cl.
CPC .......... *H01R 31/065* (2013.01); *H01R 13/22* (2013.01); *H01R 13/6675* (2013.01); *H01R 43/26* (2013.01); *H02J 7/0042* (2013.01); *H02J 7/342* (2020.01)

(58) Field of Classification Search
CPC .. H01R 43/26; H01R 13/6675; H01R 13/622; H01R 31/065; H02J 7/0044
See application file for complete search history.

(56) References Cited

U.S. PATENT DOCUMENTS

| 9,160,124 B2* | 10/2015 | Colahan | H01R 31/06 |
| D814,412 S | 4/2018 | Georgiades | |
| D816,026 S | 4/2018 | Georgiades | |
| D816,606 S | 5/2018 | Georgiades | |
| 2002/0115480 A1* | 8/2002 | Huang | H04M 19/08 |
| | | | 455/557 |
| 2015/0024625 A1* | 1/2015 | Hsieh | H01R 27/00 |
| | | | 439/540.1 |

(Continued)

OTHER PUBLICATIONS

RushCharge, "Products—Rush Charge," https://rushcharge.com/collections/all, retrieved Sep. 17, 2018, 4 pages.

(Continued)

*Primary Examiner* — Briggitte R. Hammond
(74) *Attorney, Agent, or Firm* — Ryan, Mason & Lewis, LLP

(57) ABSTRACT

An electronic device includes a housing, a removable connector comprising a base portion and an upper portion on the base portion, and a recess in the housing accommodating at least part of a removable connector, wherein at least part of the base portion is positioned in the recess. The upper portion of the removable connector comprises a male connecting element for connecting to a second electronic device. The electronic device further includes a battery configured for charging a battery of the second electronic device via the removable connector when at least the part of the base portion is positioned in the recess, and the male connecting element is coupled to the second electronic device.

17 Claims, 35 Drawing Sheets

(56) References Cited

U.S. PATENT DOCUMENTS

2019/0067966 A1* 2/2019 Zhang .................... H02J 7/02

OTHER PUBLICATIONS

RushCharge, "Rush Charge—The Best Portable Battery Bank," https://rushcharge.com, 2021, 8 pages.
Design U.S. Appl. No. 29/728,519, filed in the name of Marios Georgiades Mar. 19, 2020 and entitled "Electronic Device."
U.S. Appl. No. 17/208,589, filed in the name of Marios Georgiades Mar. 22, 2021 and entitled "Device for Charging Electronic Devices and In-Ear Headphones.".

* cited by examiner

PORTABLE CHARGER WITH INTERCHANGEABLE CONNECTORS

FIELD

The field relates generally to a device used to charge electronic devices, such as, for example, portable electronic devices, including but not necessarily limited to, mobile phones, smartphones, and tablets.

BACKGROUND

Portable personal electronic devices have become ubiquitous, and are used by many individuals on a daily basis. Such personal electronic devices may include mobile phones, smartphones, and tablet computers. It is estimated that 5 billion people worldwide have mobile devices. Individuals use such devices to access a variety of mobile applications such as, social media applications, online video and audio streaming applications, and mobile gaming applications. For example, individuals often user their devices to watch video programs, and to read written materials such as, for example, articles, reference materials and news reports.

Portable personal electronic devices typically come equipped with rechargeable battery technology such that a user need not replace their batteries when they become discharged. Such battery technology can be recharged using battery chargers, such as, for example, wall outlet chargers and portable charging devices. However, such portable charging devices may be specifically configured for a particular device and can only be connected to the device for which they are configured. In addition, if a connector of a portable charging device breaks or malfunctions, this may render the portable charger useless.

Therefore, a need exists for a portable charging device that can universally charge different types of devices, as well as provide for easy replacement of connectors.

SUMMARY

Illustrative embodiments of the invention provide a portability device configured to perform portable recharging of an electronic device.

According to an embodiment, an electronic device includes a housing, a removable connector comprising a base portion and an upper portion on the base portion, and a recess in the housing accommodating at least part of a removable connector, wherein at least part of the base portion is positioned in the recess. The upper portion of the removable connector comprises a male connecting element for connecting to a second electronic device. The electronic device further includes a battery configured for charging a battery of the second electronic device via the removable connector when at least the part of the base portion is positioned in the recess, and the male connecting element is coupled to the second electronic device.

In one or more embodiments, the male connecting element comprises one of a male micro-USB connector, a male USB-mini connector, a male USB-C connector, and a male lightning connector. The recess comprises one or more electrical contacts at a base of the recess, and the base portion of the removable connector comprises one or more electrical recesses receiving the one or more electrical contacts when at least the part of the base portion is positioned in the recess. The one or more electrical recesses are positioned on a bottom side of the base portion.

In illustrative embodiments, the base portion of the removable connector comprises one or more recesses on one or more sides of the base portion engaging one or more protrusions in the recess when at least the part of the base portion is positioned in the recess. The electronic device further comprises a release button connected to the one or more protrusions so that when activated, the release button releases the one or more protrusions from engagement with the one or more recesses.

The electronic device may comprise a storage recess in the housing in which an additional removable connector is positioned, wherein the additional removable connector comprises a different type male connecting element than the removable connector. The recess is positioned at a top surface of the electronic device, and the storage recess is positioned a side surface of the device adjacent the top surface. The recess receives at least part of the additional removable connector in place of the removable connector. The battery is configured for charging the battery of the second electronic device via the additional removable connector when at least the part of the additional removable connector is positioned in the recess.

According to an embodiment, a removable connector for an electronic device includes a base portion comprising one or more electrical recesses positioned on a bottom side of the base portion, wherein the base portion is insertable into a recess of the electronic device, and an upper portion on the base portion. The upper portion comprises a male connecting element for connecting to a second electronic device. The base portion further comprises one or more recesses on one or more sides of the base portion adjacent the bottom side of the base portion.

According to an embodiment, a method includes inserting a removable connector into a recess in a housing of an electronic device. The removable connector comprises a base portion and an upper portion on the base portion, wherein at least part of the base portion is inserted into the recess, and wherein the upper portion comprises a male connecting element for connecting to a second electronic device. The method further includes connecting the male connecting element to the second electronic device, and charging a battery of the second electronic device via the electronic device and the removable connector.

The recess comprises one or more electrical contacts at a base of the recess, and the base portion comprises one or more electrical recesses receiving the one or more electrical contacts when at least the part of the base portion is inserted in the recess. The base portion also comprises one or more recesses on one or more sides of the base portion engaging one or more protrusions in the recess when at least the part of the base portion is inserted in the recess.

The method further includes activating a release button connected to the one or more protrusions to release the one or more protrusions from engagement with the one or more recesses, and removing the removable connector from the recess in the housing. The method also includes storing an additional removable connector in a storage recess in the housing, wherein the additional removable connector comprises a different type male connecting element than the removable connector. In the method, the removable connector is removed from the recess in the housing, the additional removable connector is removed from the storage recess, the removable connector is replaced with the additional removable connector in the recess, and the additional removable connector is replaced with the removable connector in the storage recess.

DETAILED DESCRIPTION

Figure 1:
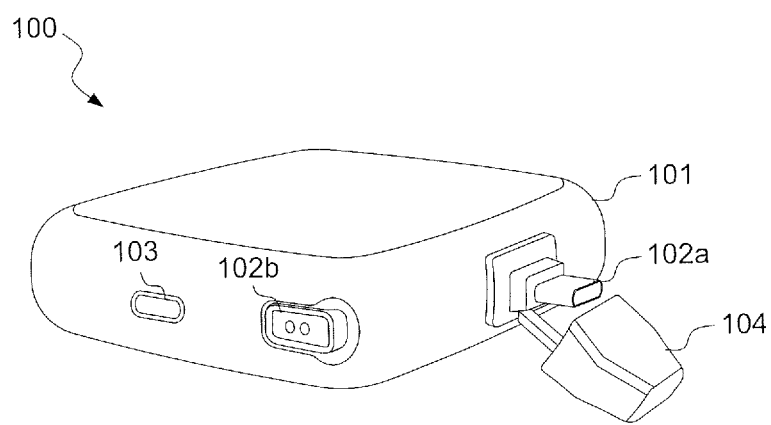
FIGS. 1-6 illustrate a portable charging device in accordance with an embodiment of the invention.
Figure 2:
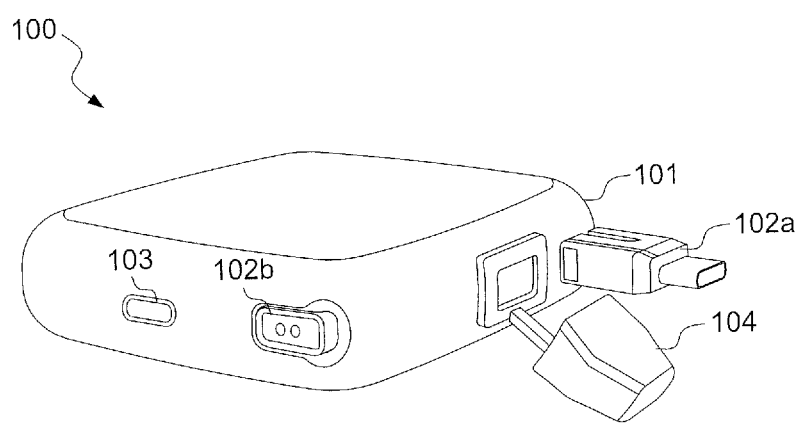
Figure 3:
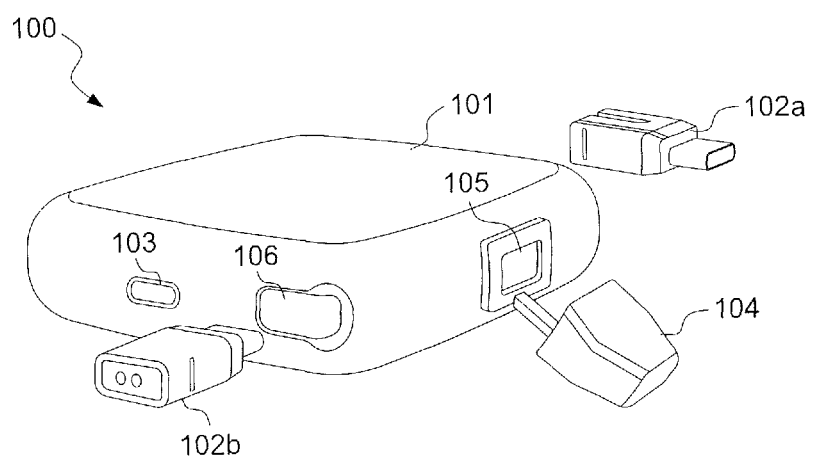
Figure 4:
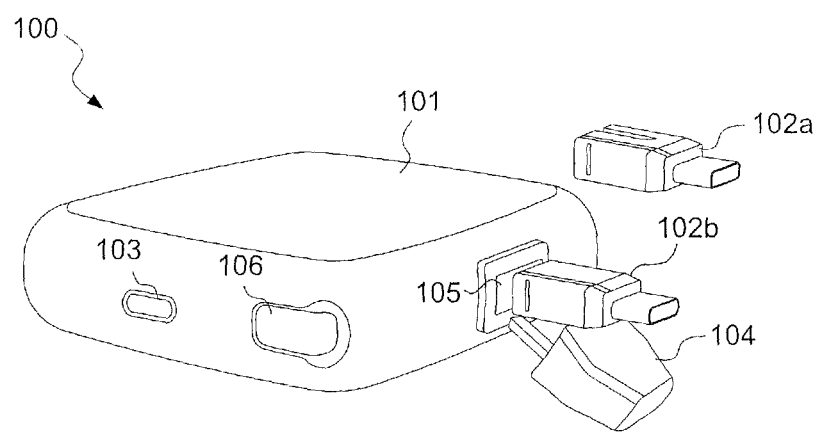
Figure 5:
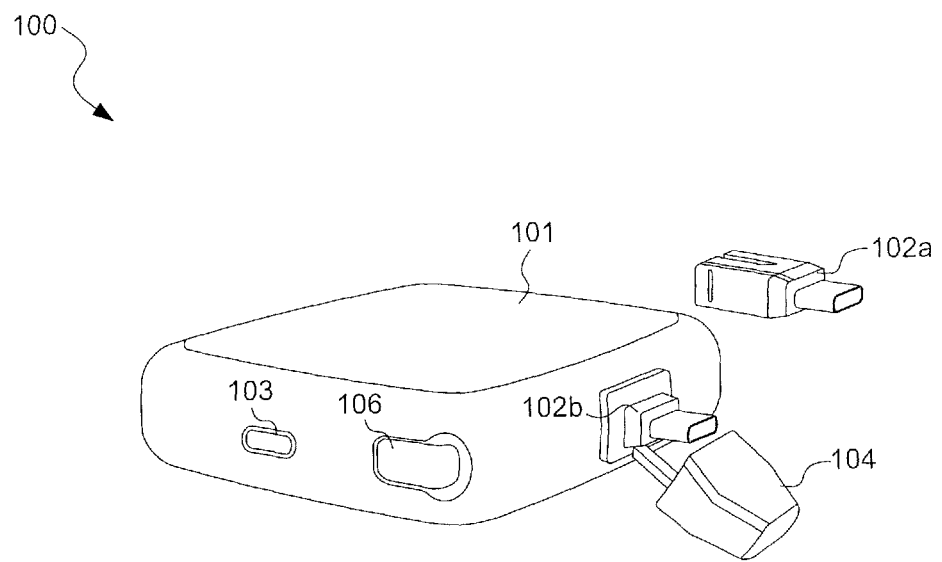
Figure 6:
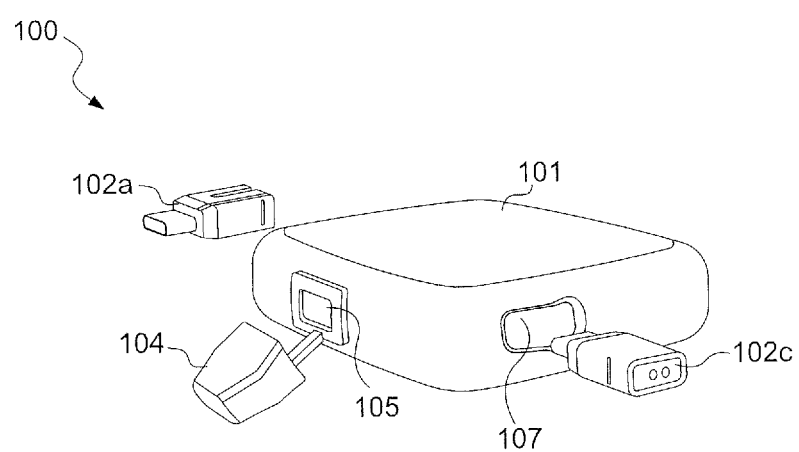
Figure 7:
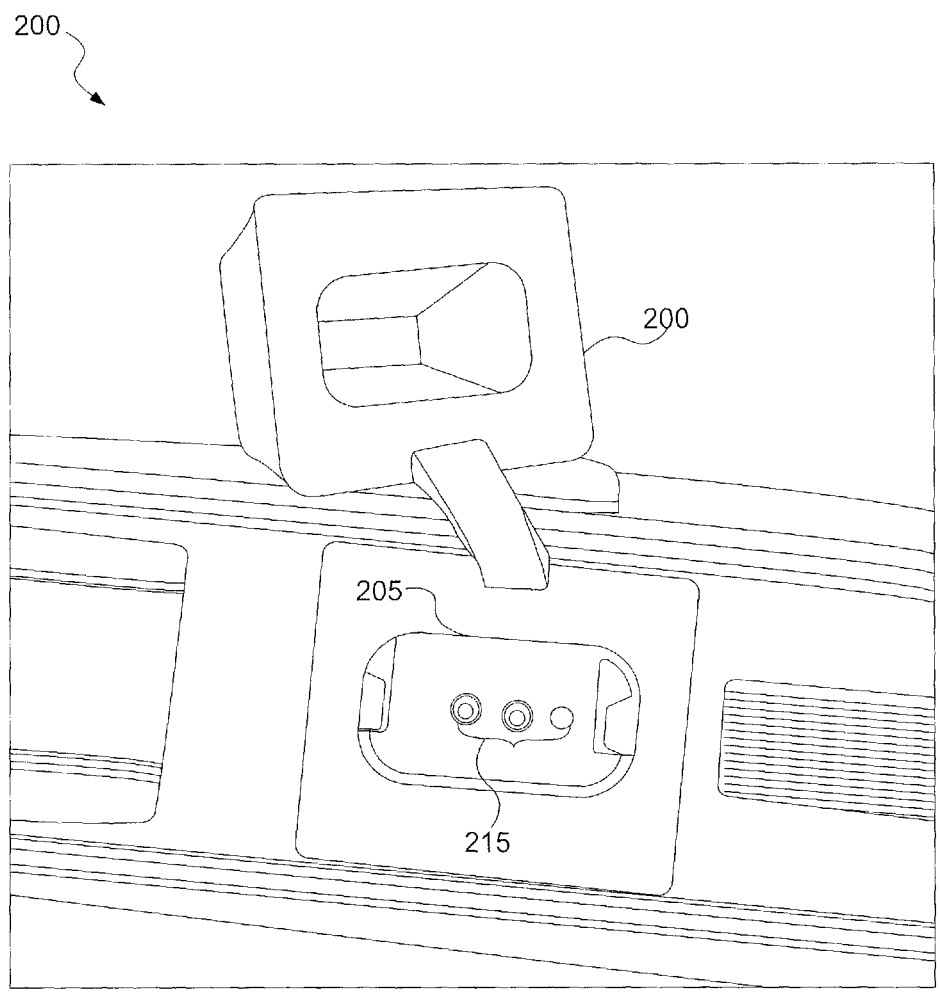
FIG. 7 illustrates a portable charging device in accordance with an embodiment of the invention.
Figure 8:
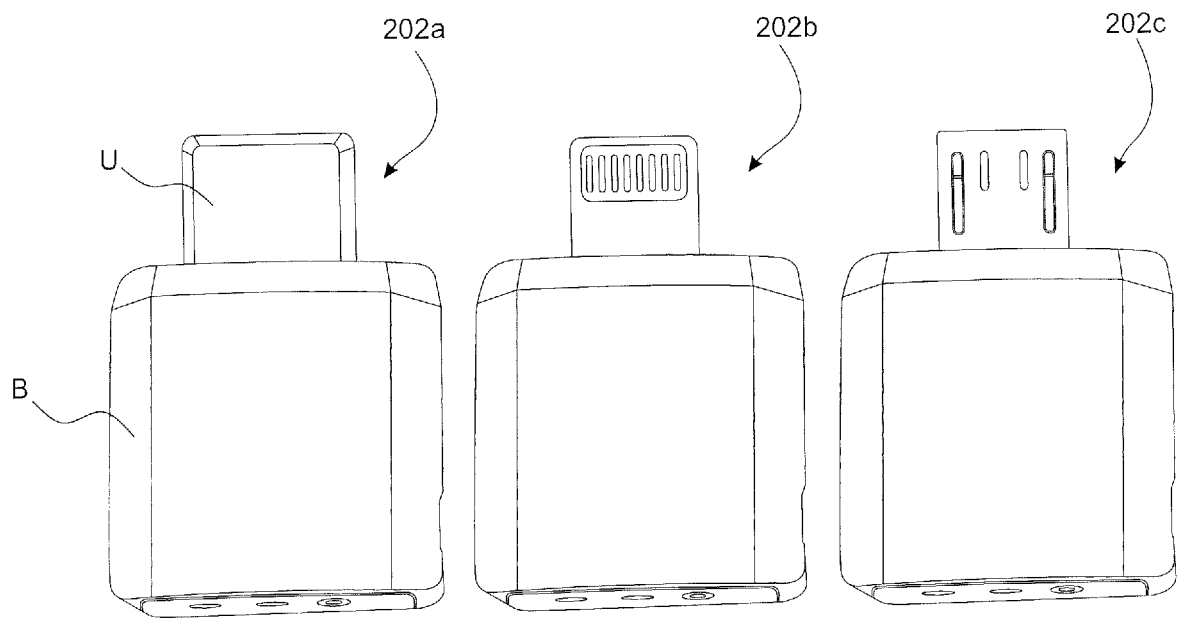
FIGS. 8-10 illustrate connectors for a portable charging device in accordance with an embodiment of the invention.
Figure 9:
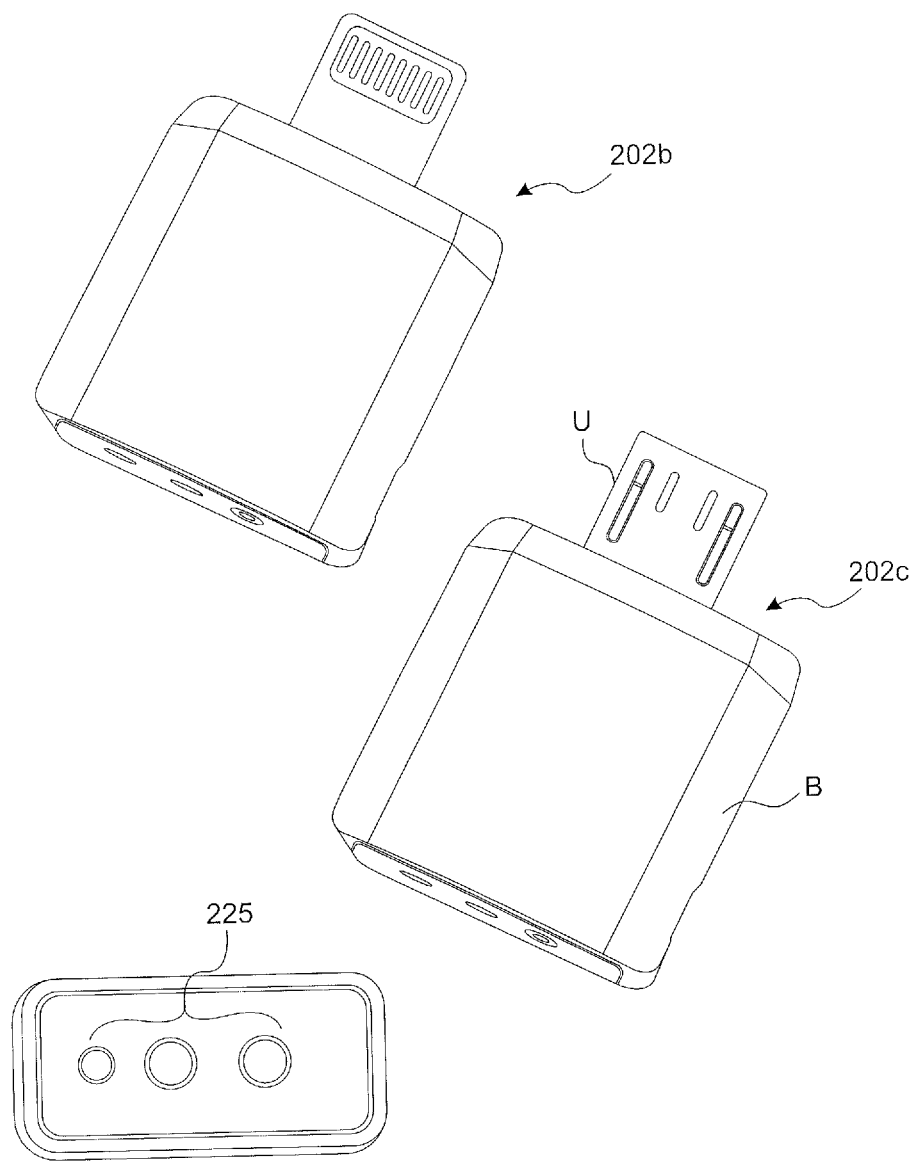
Figure 10:
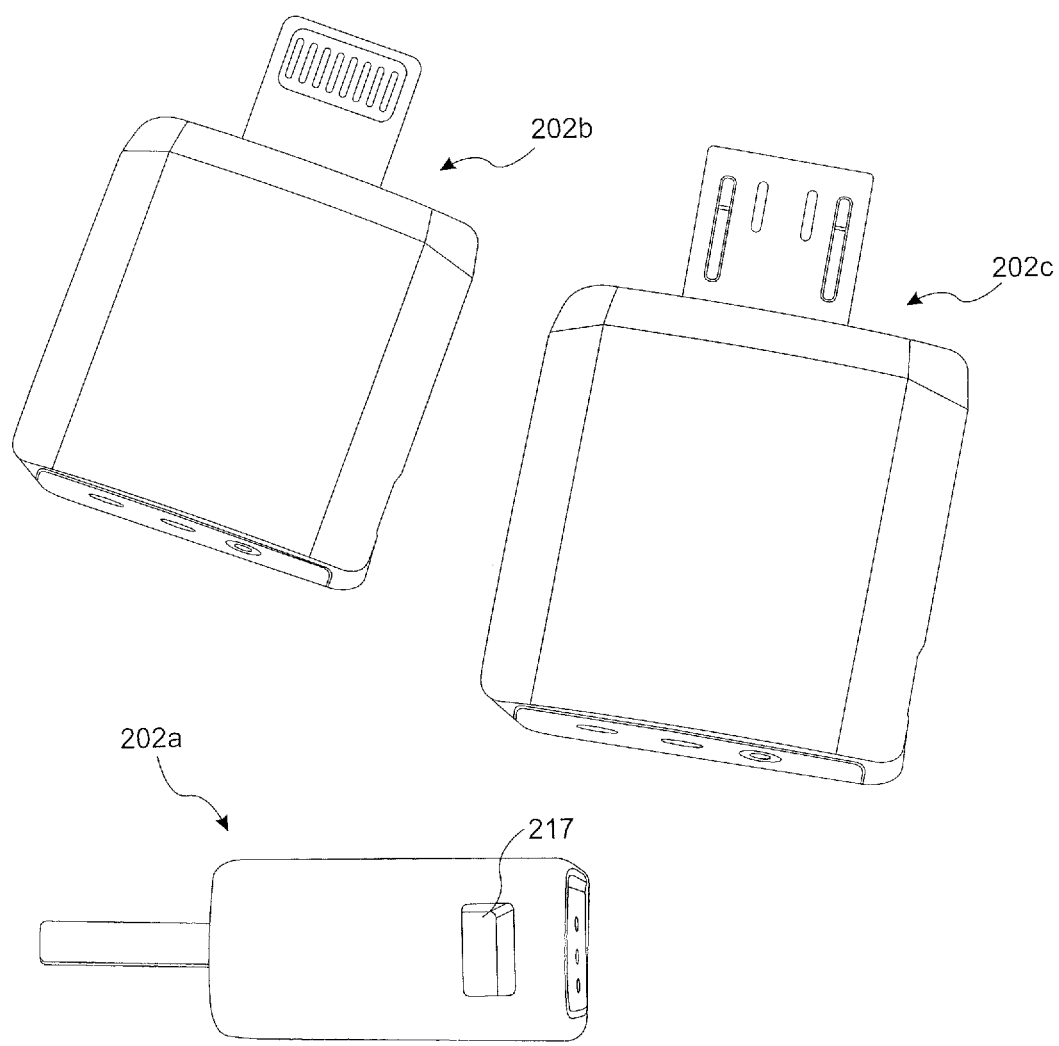

Illustrative embodiments of the invention provide a portable charging device with removable and interchangeable connectors.

Referring to FIGS. 1-6, a portable charging device 100 includes a housing 101 and a plurality of removable and interchangeable connectors 102a, 102b and 102c. Two of the connectors (e.g., connectors 102b and 102c) are positioned in recesses 106 and 107 (e.g., storage recesses) on opposite sides of the housing 101, while one of the connectors (e.g., 102a) is positioned in a recess 105 on a top central portion of the housing 101. The connector positioned in the recess 105 is electrically connected to a battery of the device to charge a personal electronic device (e.g., a mobile phone, smartphone, tablet computer, etc.) connected to the portable charging device 100 via the connector (e.g., 102a). The connectors (e.g., connectors 102b and 102c) positioned in recesses 106 and 107 are reserve/alternate connectors, which can replace the connector positioned in the recess 105. The reserve connectors can be different types of connectors from the connector in the recess (e.g., male micro-universal serial bus (USB) connector, a male USB-mini connector, a male USB-C connector, a male lightning (Apple®) connector or other type of portable device connector) so as to charge a differently configured personal electronic device (e.g., iPhone vs. Android phone) or may be the same type of connector as the connector in the recess 105 to replace the connector in the recess 105 if that connector breaks or fails to operate. As can be seen in FIGS. 2-5, the connector 102a is removed from the recess 105 and replaced by the connector 102b, which is removed from the recess 106 and inserted into the recess 105. Similarly, referring to FIG. 6, the connector 102a is removed from the recess 105 and replaced by the connector 102c, which is removed from the recess 107 and inserted into the recess 105. The connector 102a, if replaced by one of the connectors 102b or 102c can be inserted in one of the recesses 106 or 107 in place the connector 102b or 102c.

A rechargeable battery is disposed in the housing 101, and is electrically connected to the connector in the recess 105. The connectors 102a, 102b and 102c are configured for being inserted into a female connector of a second electronic device, including but not necessarily limited to, a mobile phone, smartphone or a tablet. The second electronic device is charged via the battery in the housing 101 when connected to the portable charging device 100 via one of the connectors 102a, 102b or 102c in the recess 105.

The housing 101 comprises a female connector 103 electrically connected to the battery in the housing 101 via, for example, a printed circuit board assembly (PCBA) (not shown) and one or more wires (not shown). The female connector 103 is configured for receiving, for example, a male micro-USB connector, a male USB-mini connector, a male USB-C connector, a male lightning connector, or other type of connector that is connected to a power source, such as, for example, a standard household outlet providing 15 amperes (amps) of current and 120 volts. The battery of the device 100 is able to be charged via the female connector 103 when connected to the power source.

In operation, when the second electronic device (e.g., smartphone, tablet or other rechargeable portable personal electronic device) is connected to the device 100 via one of the connectors 102a, 102b or 102c in the recess 105, the device 100 via the PCBA, is configured for having the battery charge a battery of the connected second electronic device.

In addition, as described above, a power source can be connected to the device via the female connector 103. The power source (e.g., from a wall outlet or other charging device) can be connected to the device 100 while the second electronic device is connected to the device 100 via one of the connectors 102a, 102b or 102c and charging. The device is configured via the PCBA to have pass through technology, such that using the power source, the battery in the device 100 can be recharging while a connected second device is also being charged.

According to an embodiment, the PCBA includes load balancing circuitry and power regulating circuits to transfer power from the power source to the battery in the device 100 and to the connected second device. As can be understood, the device 100 is a portable charging device that can be used to charge other devices while not connected to (e.g., plugged into) a power source, or while connected to (plugged into) a power source.

In an embodiment, the portable charging device 100 maintains portability features such that, in a non-limiting example, the portable charging device 100 is small enough to fit in one's pocket for storage. A cap 104 can be used to cover and protect the connector in the recess 105.

The device 100 further includes a plurality of light emitting diodes (LEDs) on a surface of the housing 101. The LEDs are electrically connected to the PCBA and are connected to circuitry in the PCBA to enable the LEDs to indicate a charge status of the battery in the housing 101. For example, the charge status of the battery can be indicated by a number of the LEDs that are lit at a given time and/or by the color of the LEDs. The number of LEDs that are lit is proportional to the amount of charge of the battery (e.g., less lit LEDs=less charge, and more lit LEDs=more charge). In addition or as an alternative to indicating charge status with the number of lit LEDs, a color of the LEDs may indicate an amount of charge for the battery (e.g., green/blue—75-100% charged, yellow—25-50% charged, red—0-25% charged). Other indicators besides LEDs may be used.

FIGS. 7-10 show another embodiment of a portable charging device 200 comprising a plurality of removable and interchangeable connectors 202a, 202b and 202c and cap 204. As can be seen, these connectors 202a, 202b and 202c include different types (e.g., male USB-C connector or a male lightning connector) on respective upper portions U. The connectors 202a, 202b and 202c include electrical recesses 225 on respective bottom portions B for connecting to electrical contacts 215 when the connectors 202a, 202b and 202c are inserted into the recess 205. The connectors 102a, 102b and 102c similarly have upper and bottom portions and 2 or 3 recesses for connecting to contacts in the recess 105. Part of the bottom portion of each connector 102a, 102b and 102c in inserted into the recess 105.

Figure 16:
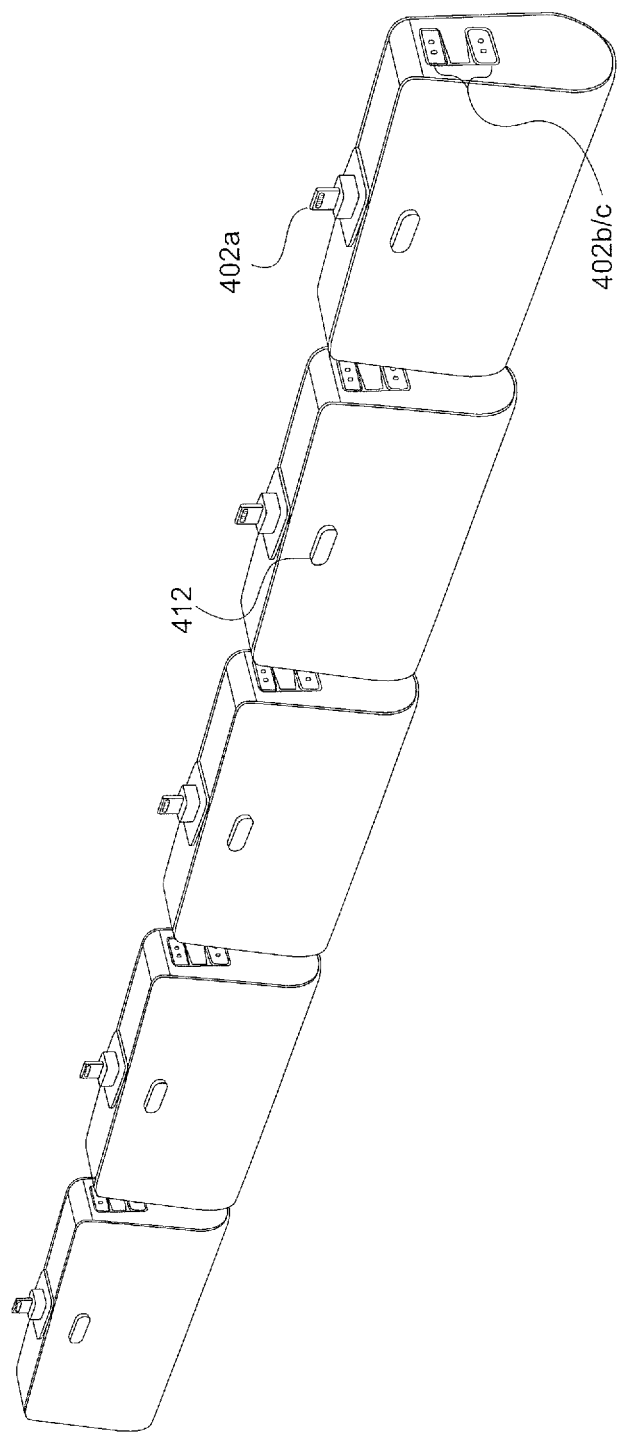
Figure 17:
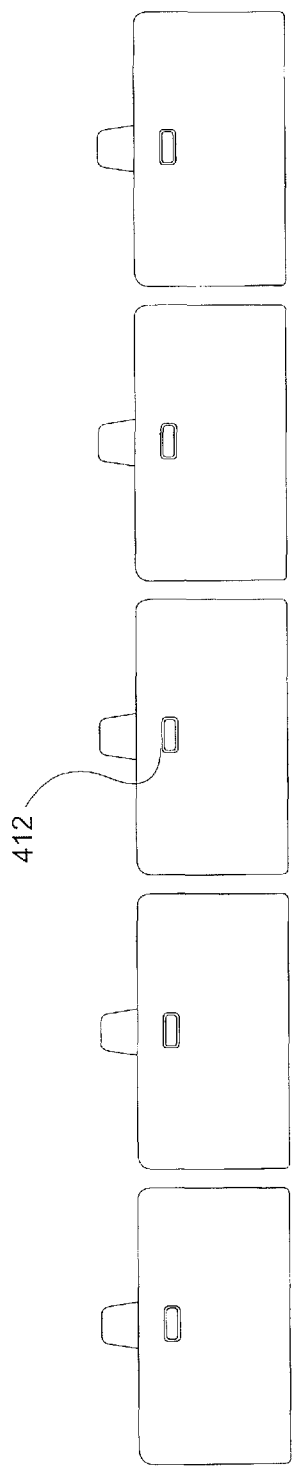
Figure 18:
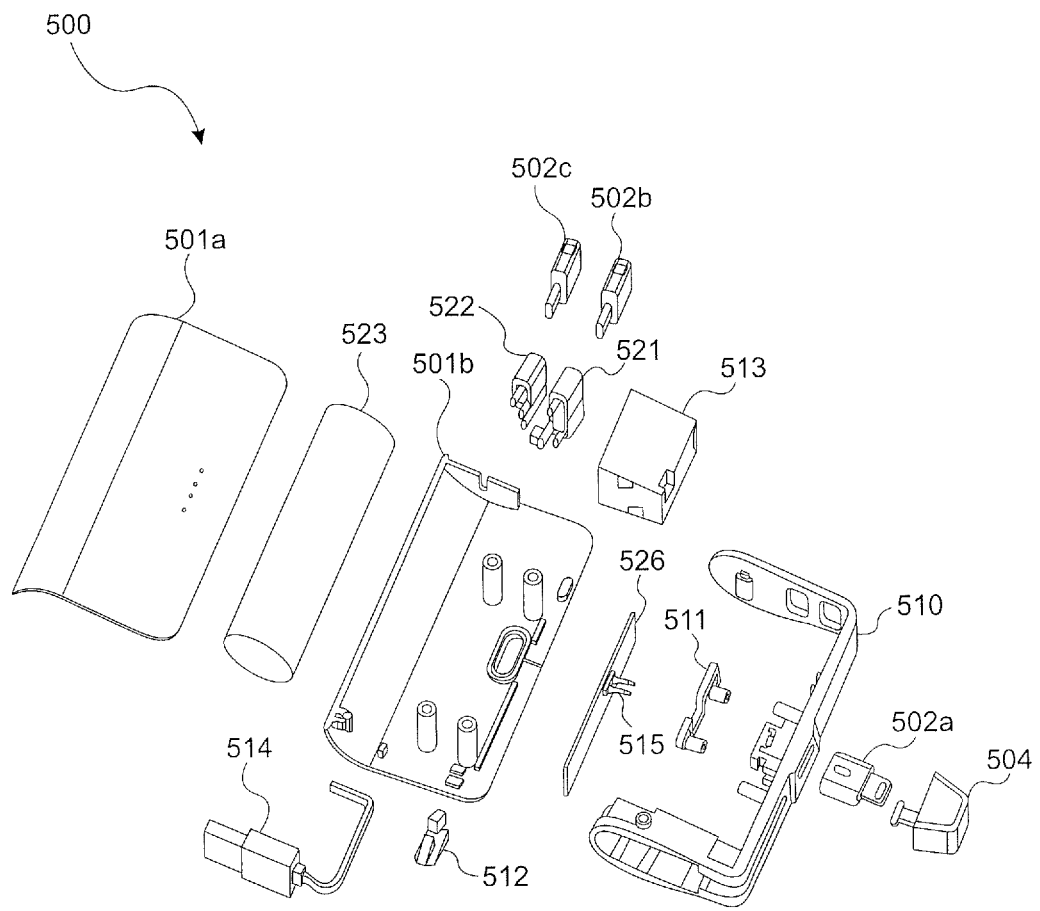
FIG. 18 illustrates an exploded view of portable charging device in accordance with an embodiment of the invention.
Figure 19:
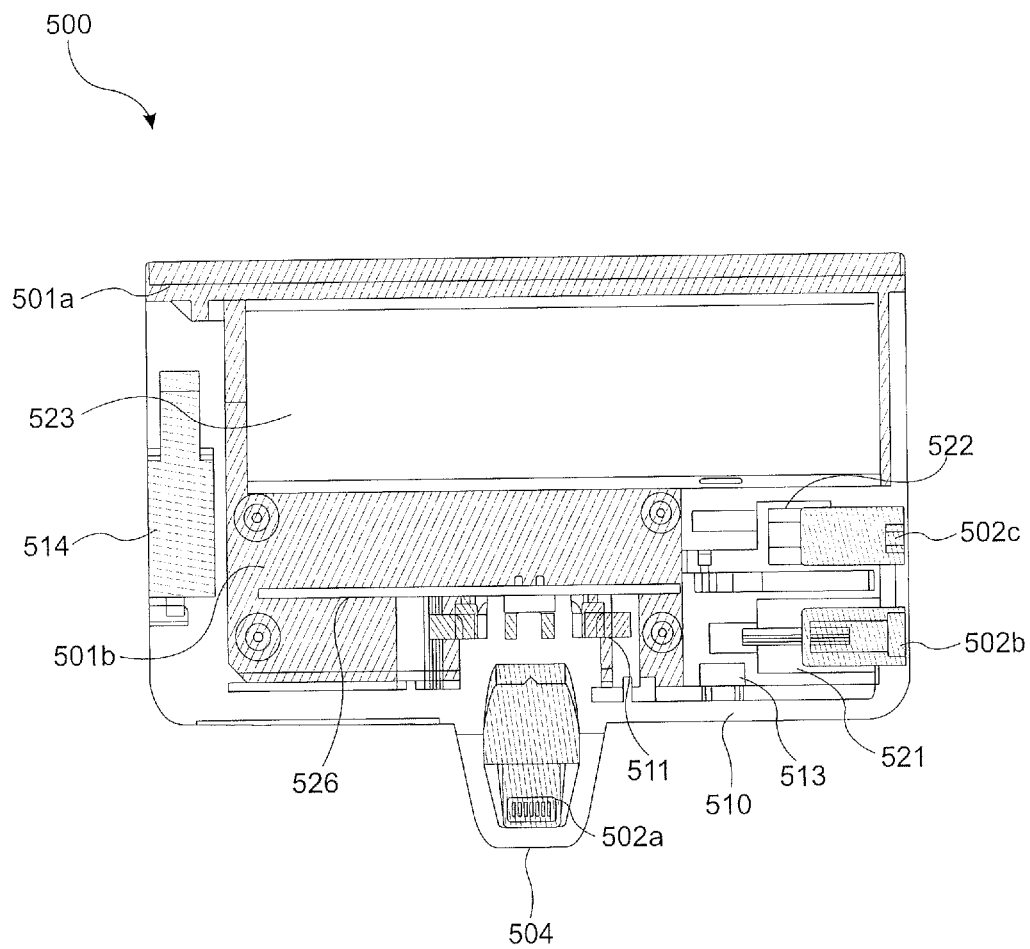
FIG. 19 illustrates a cross-sectional view of portable charging device in accordance with an embodiment of the invention.
Figure 20:
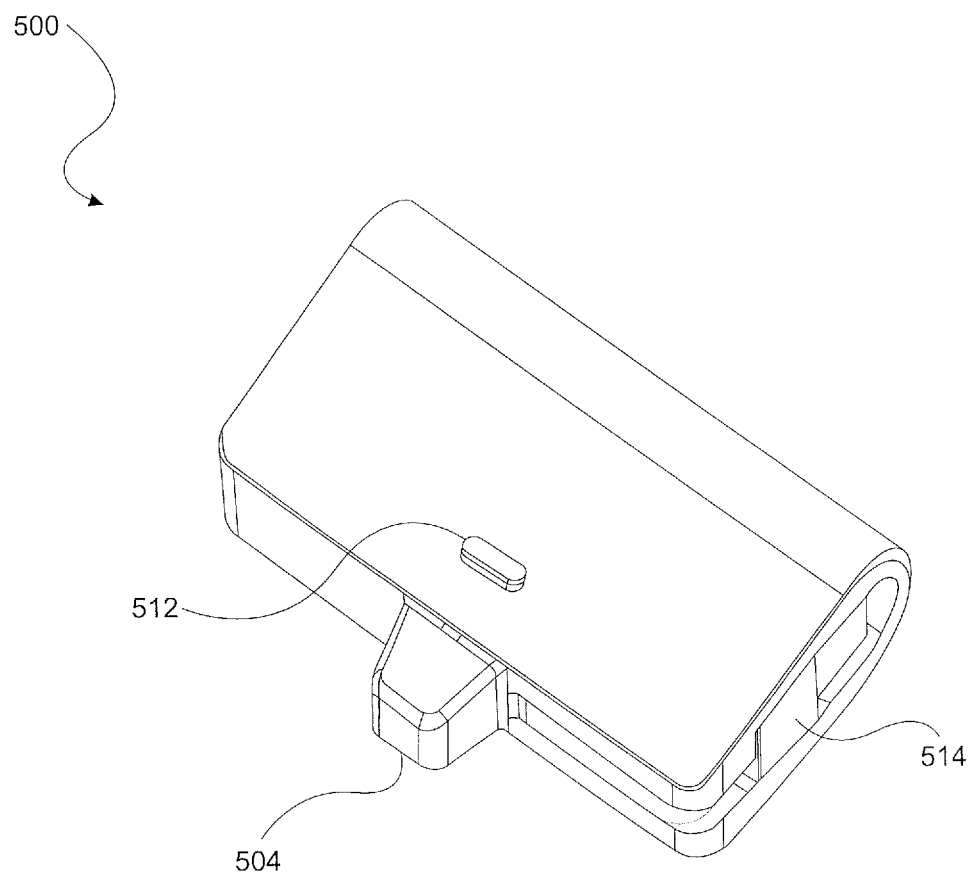
FIG. 20 illustrates a perspective view of portable charging device in accordance with an embodiment of the invention.
Figure 21:
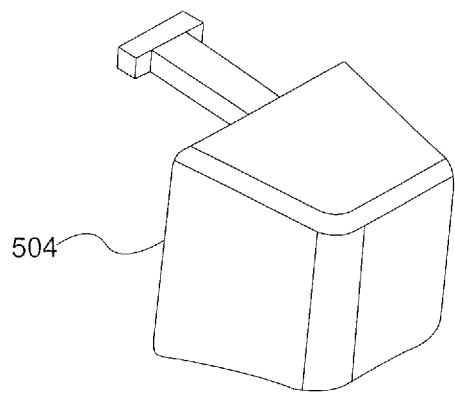
FIG. 21 illustrates a cap for a portable charging device in accordance with an embodiment of the invention.
Figure 22:
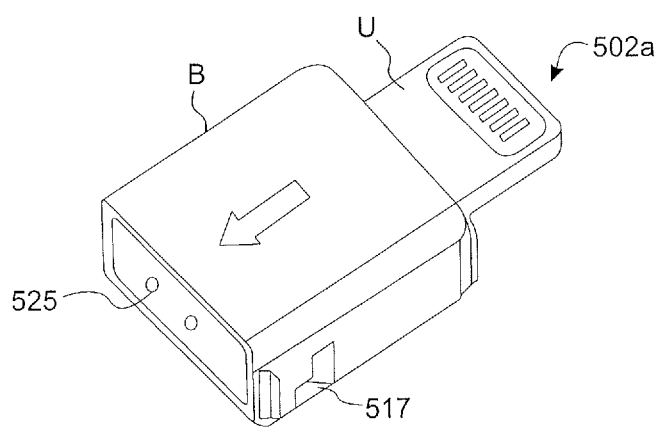
FIG. 22 illustrates a connector for a portable charging device in accordance with an embodiment of the invention.
Figure 23:
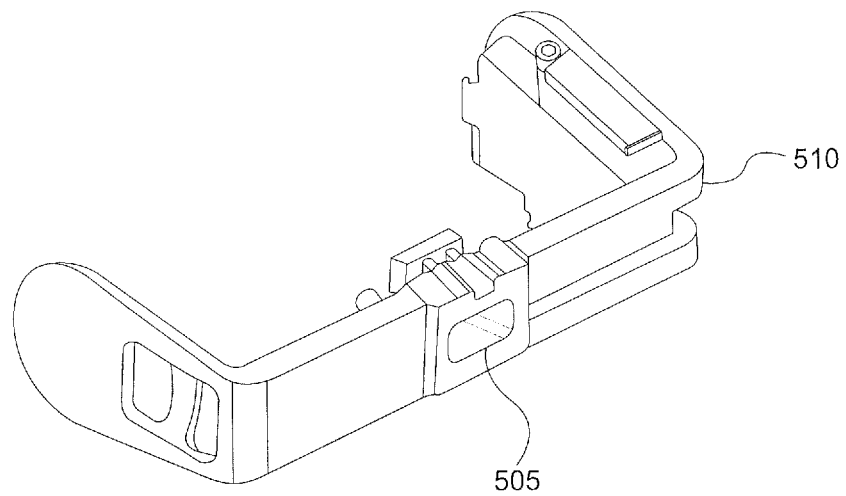
FIG. 23 illustrates a housing for a portable charging device in accordance with an embodiment of the invention.
Figure 24:
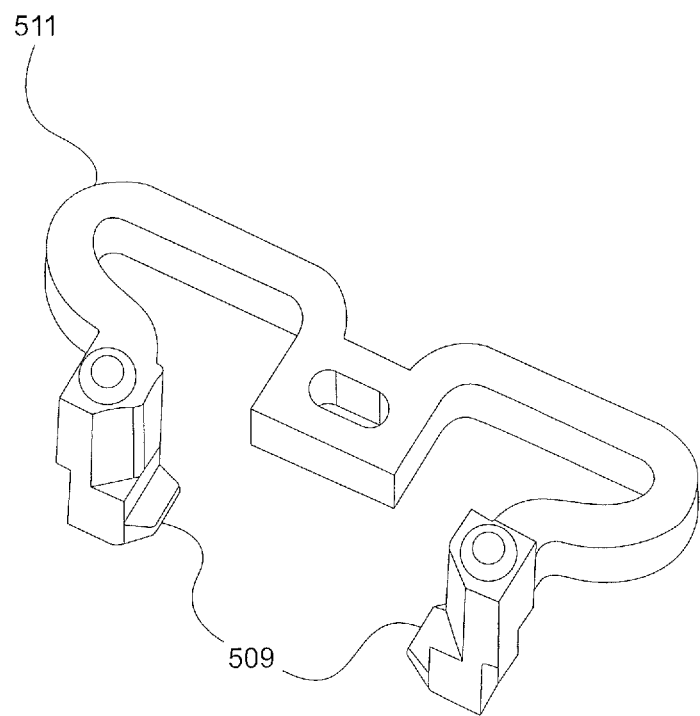
FIG. 24 illustrates a connecting element for a portable charging device in accordance with an embodiment of the invention.
Figure 25:
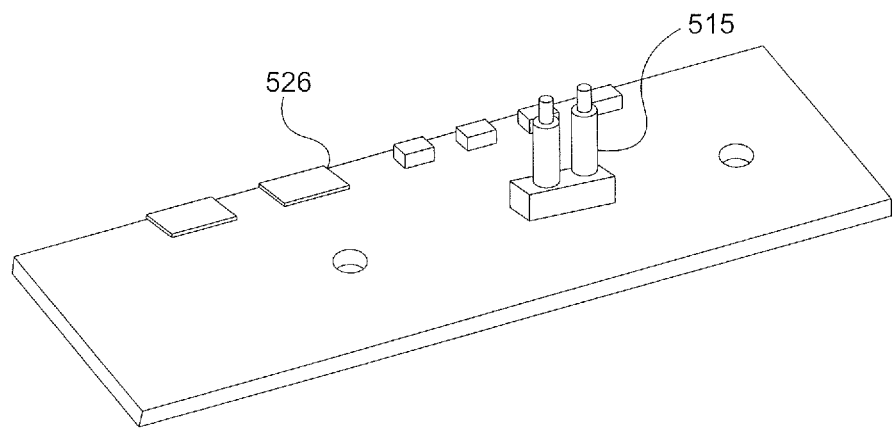
FIG. 25 illustrates a printed circuit board assembly (PCBA) for a portable charging device in accordance with an embodiment of the invention.
Figure 26:
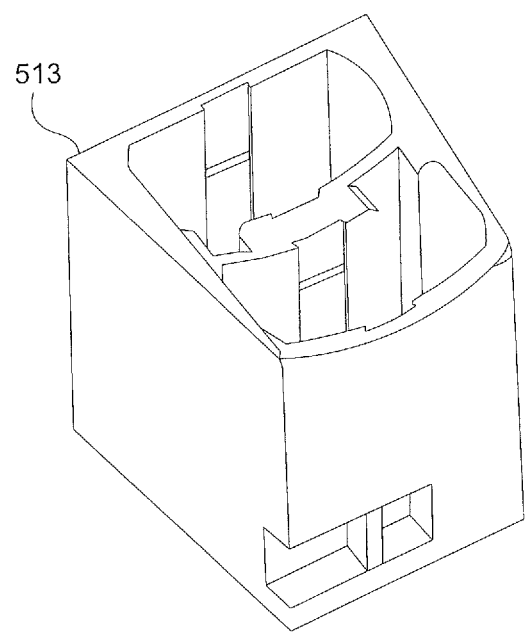
FIG. 26 illustrates an eject box for a portable charging device in accordance with an embodiment of the invention.
Figure 27:
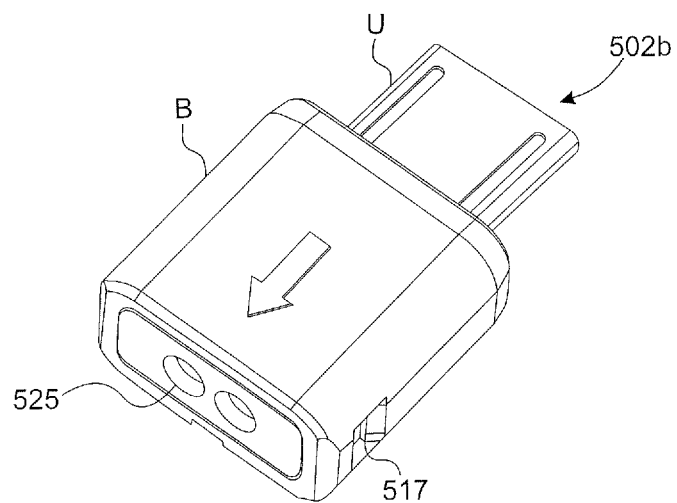
FIGS. 27 and 28 illustrate connectors for a portable charging device in accordance with an embodiment of the invention.
Figure 28:
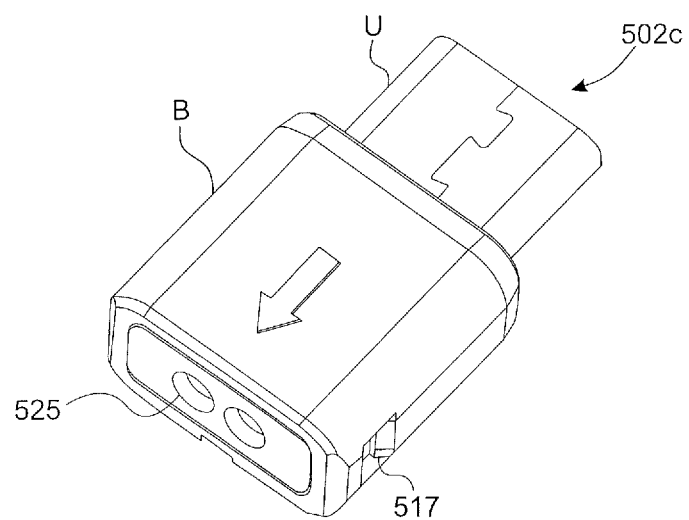
Figure 29:
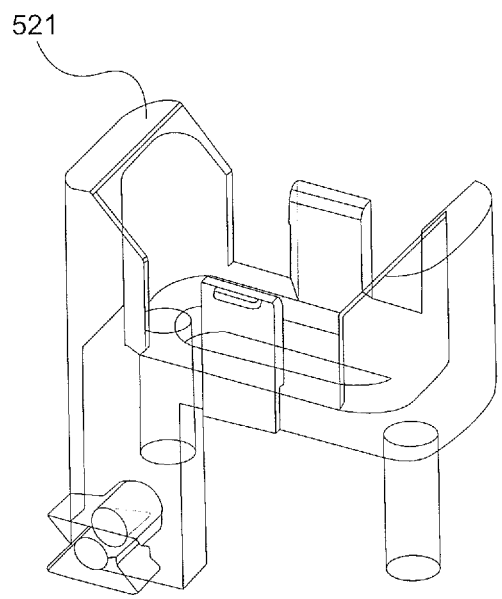
FIGS. 29 and 30 illustrate loaded elements for a portable charging device in accordance with an embodiment of the invention.
Figure 30:
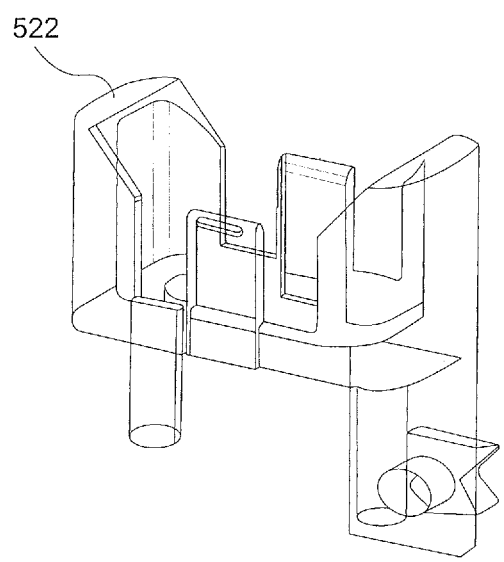
Figure 31:
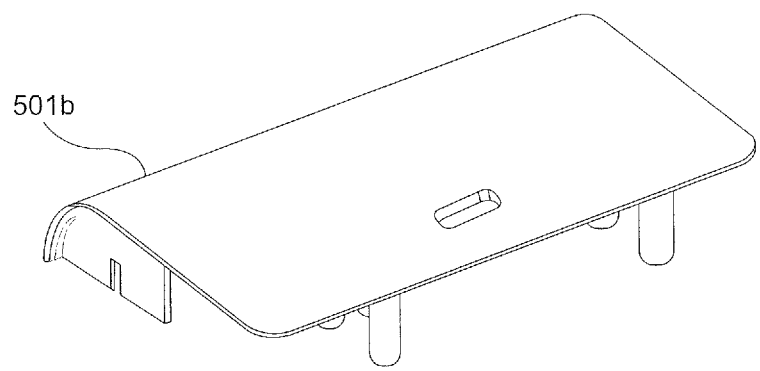
FIG. 31 illustrates a housing portion for a portable charging device in accordance with an embodiment of the invention.
Figure 32:
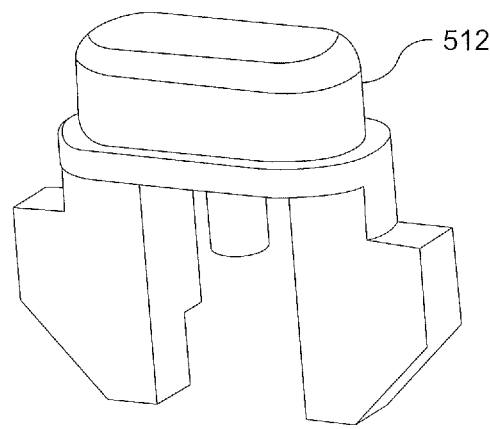
FIG. 32 illustrates a release button for a portable charging device in accordance with an embodiment of the invention.
Figure 33:
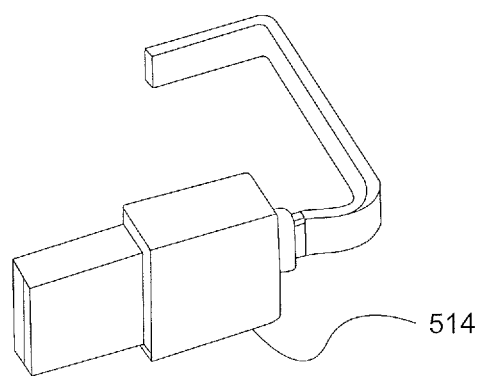
FIG. 33 illustrates a universal serial bus (USB) plug for a portable charging device in accordance with an embodiment of the invention.
Figure 34:
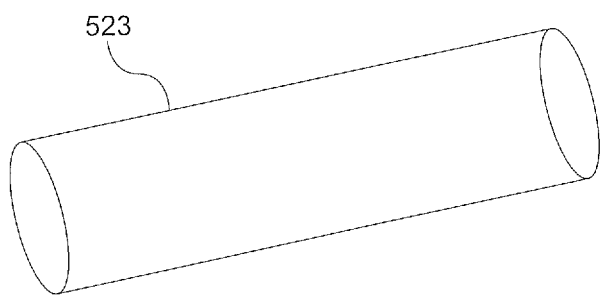
FIG. 34 illustrates a battery for a portable charging device in accordance with an embodiment of the invention.
Figure 35:
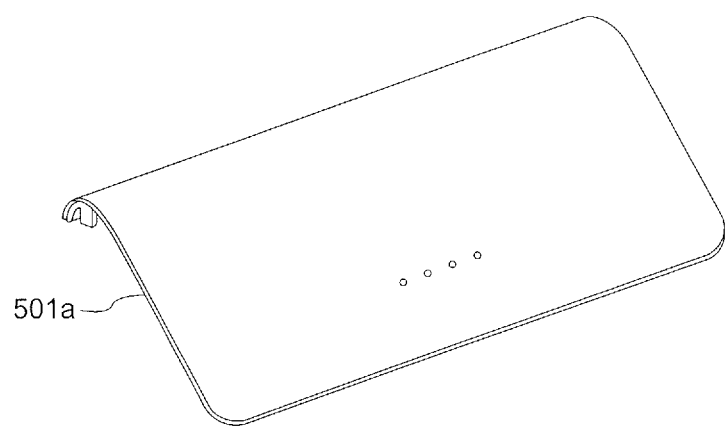
FIG. 35 illustrates a housing portion for a portable charging device in accordance with an embodiment of the invention.
Figure 36:
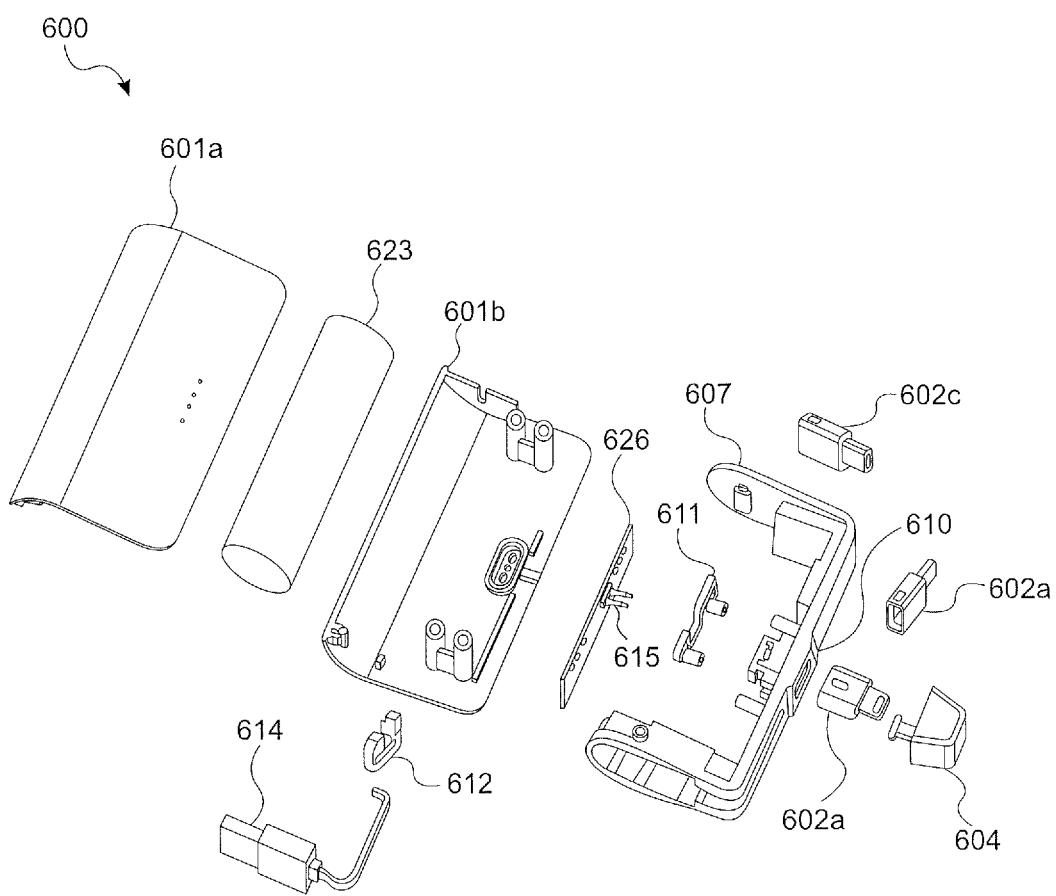
FIG. 36 illustrates an exploded view of portable charging device in accordance with an embodiment of the invention.
Figure 37:
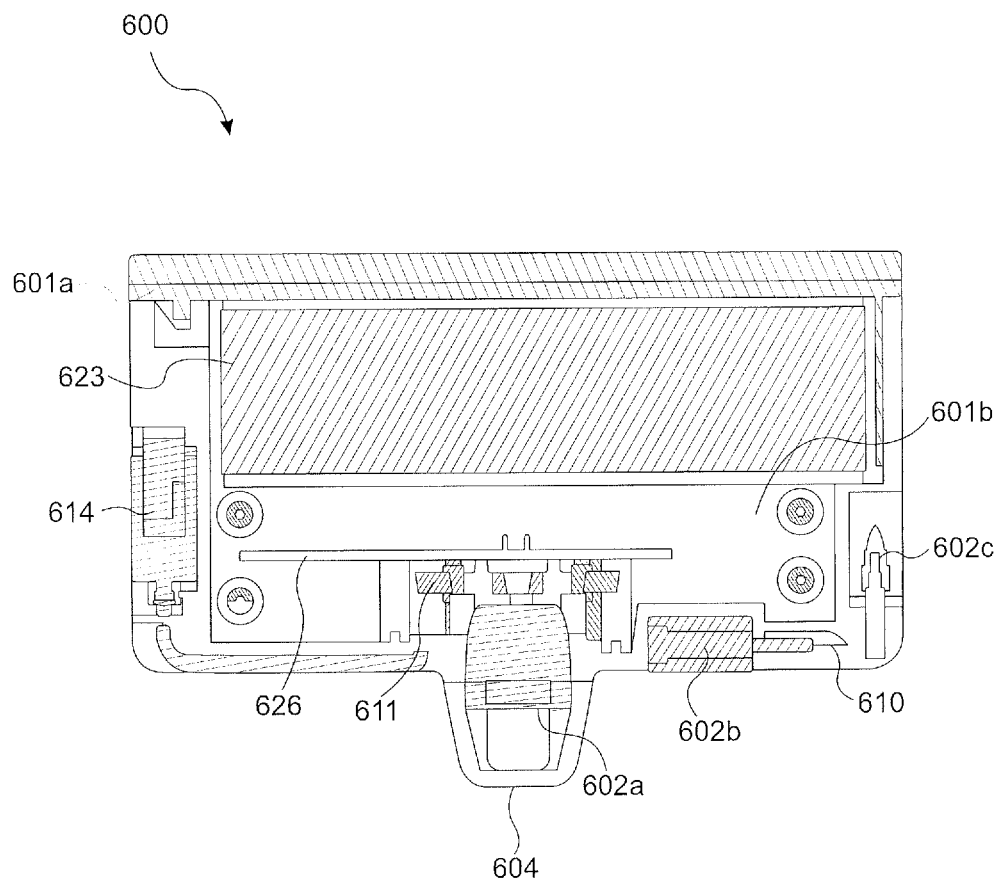
FIG. 37 illustrates a cross-sectional view of portable charging device in accordance with an embodiment of the invention.
Figure 38:
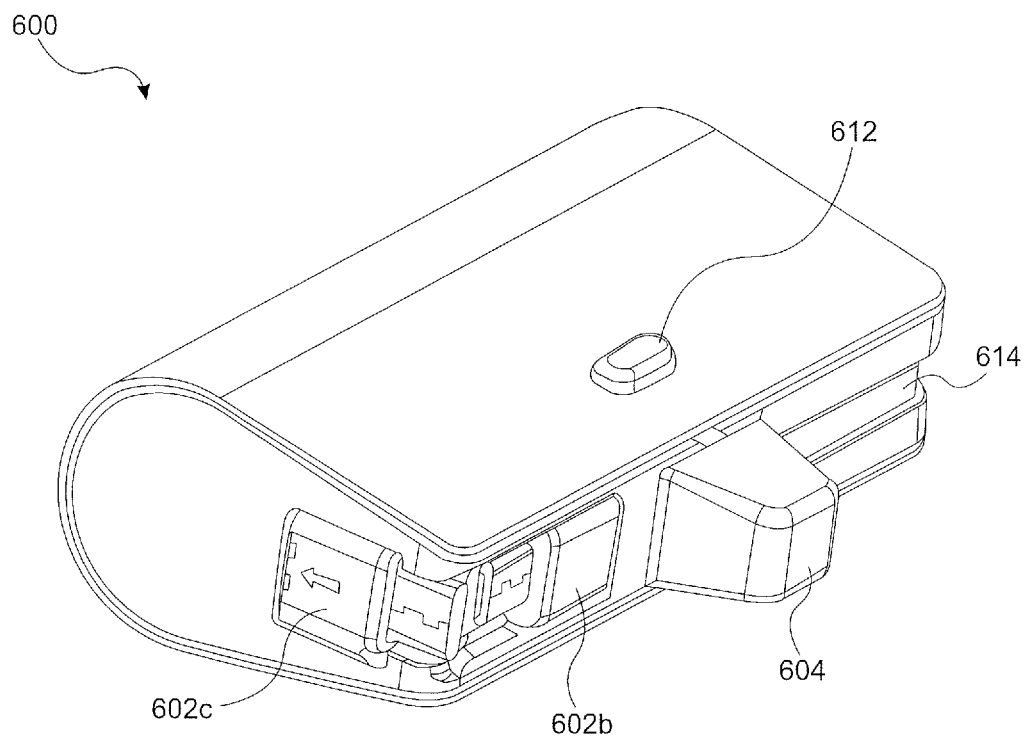
FIG. 38 illustrates a perspective view of portable charging device in accordance with an embodiment of the invention.
Figure 39:
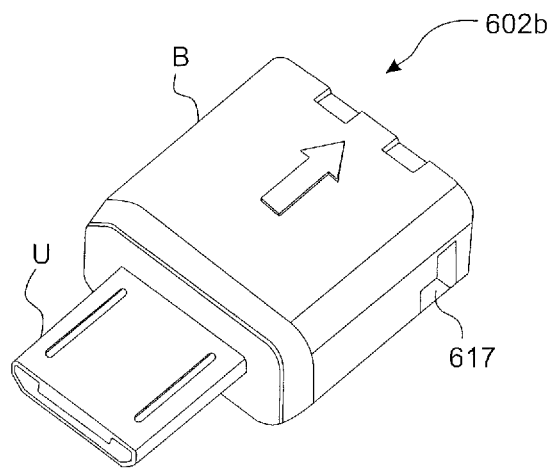
FIGS. 39 and 40 illustrate connectors for a portable charging device in accordance with an embodiment of the invention.
Figure 40:
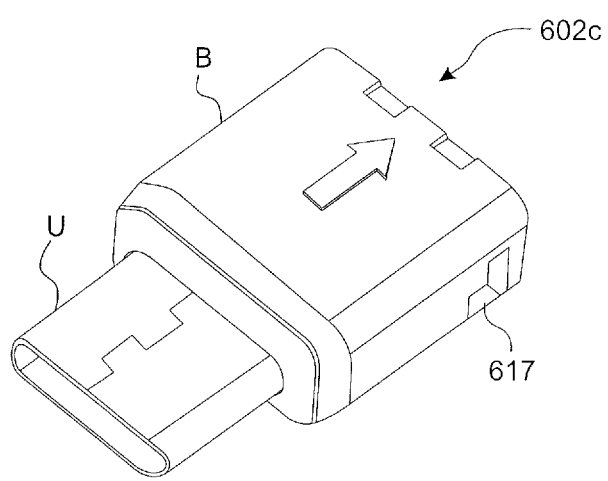
Figure 41:
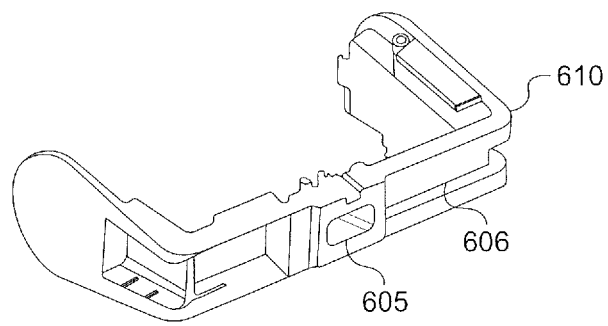
FIG. 41 illustrates a housing for a portable charging device in accordance with an embodiment of the invention.
Figure 42:
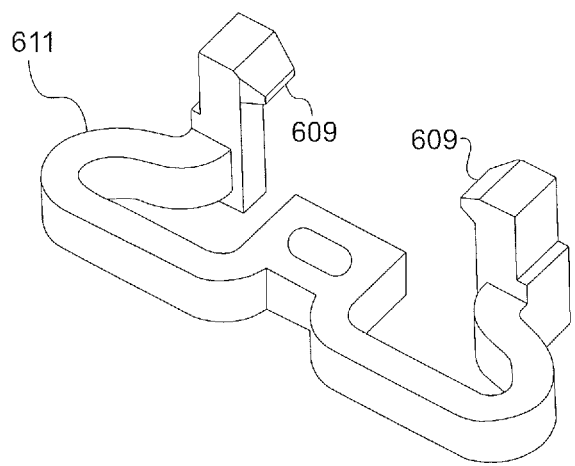
FIG. 42 illustrates a connecting element for a portable charging device in accordance with an embodiment of the invention.
Figure 43:
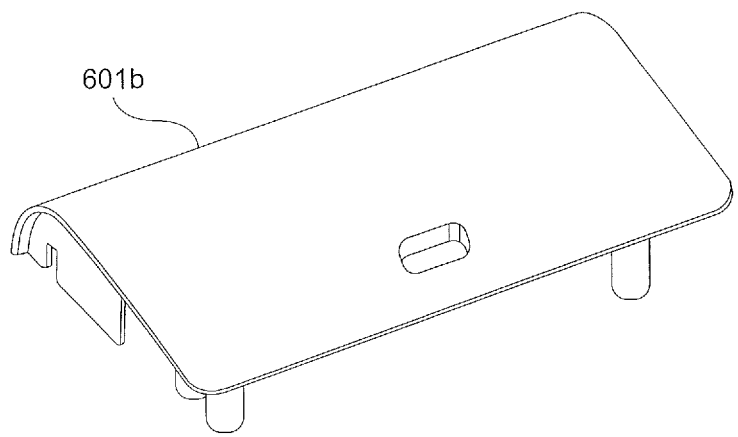
FIG. 43 illustrates a housing portion for a portable charging device in accordance with an embodiment of the invention.
Figure 44:
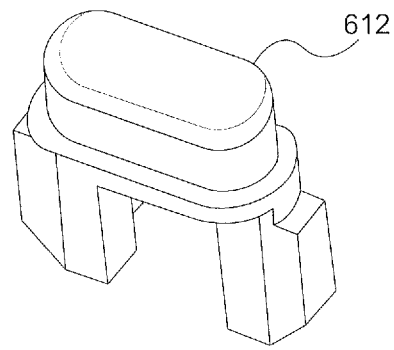
FIG. 44 illustrates a release button for a portable charging device in accordance with an embodiment of the invention.
Figure 45:
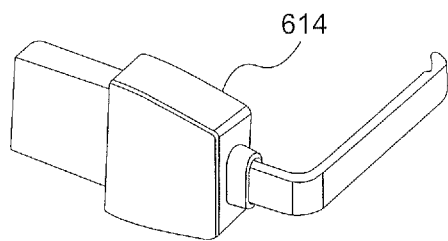
FIG. 45 illustrates a universal serial bus (USB) plug for a portable charging device in accordance with an embodiment of the invention.

The connectors 202a, 202b and 202c also comprise one or more recesses 217 on one or more sides of the bottom portions B to engage spring or material memory loaded protrusions in the recess 205 for securing the connectors in the recess 205. Such recesses can similarly be in bottom portions of the connectors 102a, 102b and 102c for securing the connectors 102a, 102b and 102c in the recess 105, and/or in the recesses 106 and 107 As explained herein, one or more release buttons (e.g., 312 in FIGS. 11 and 412 in FIGS. 16 and 17) can be positioned on the housing of a portable charging device to release the connectors from one or more of the recesses.

Figure 11:
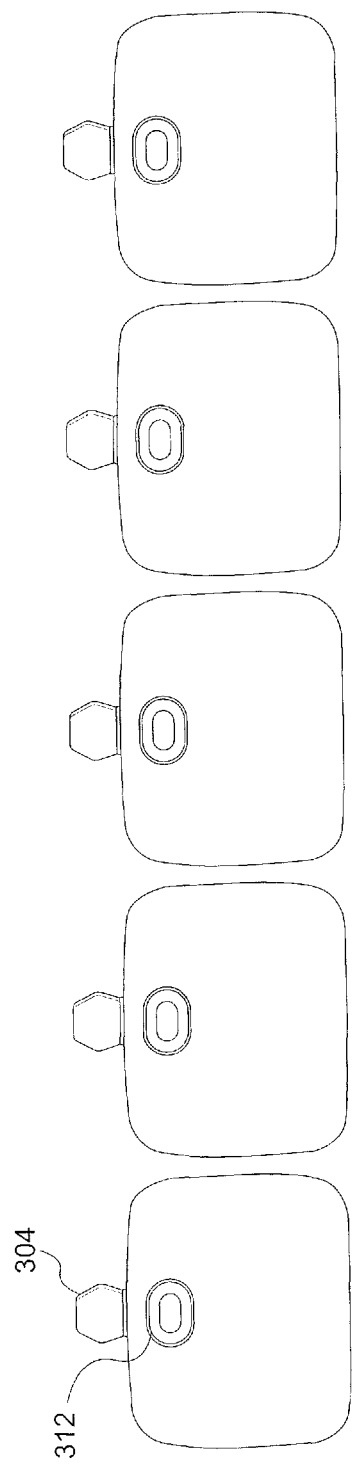
FIGS. 11-13 illustrate portable charging devices in accordance with an embodiment of the invention.
Figure 12:
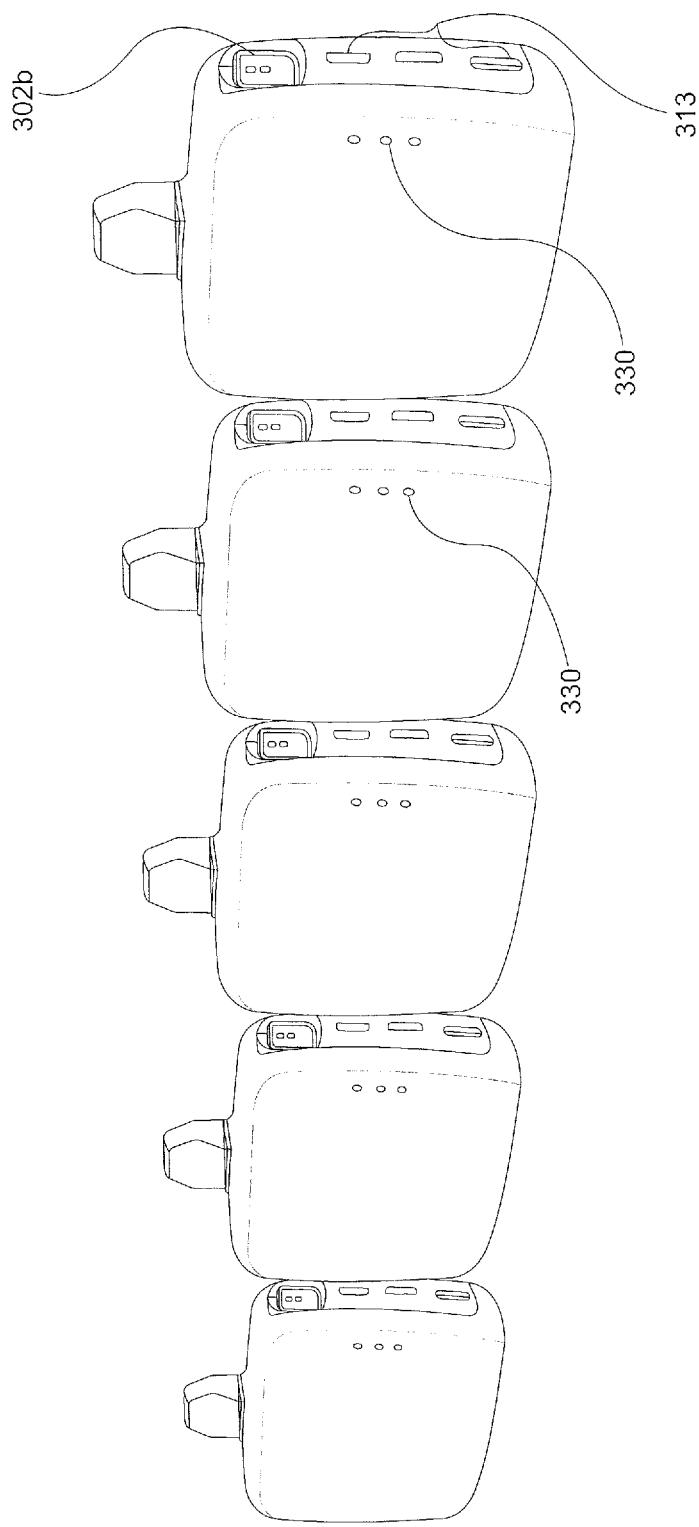
Figure 13:
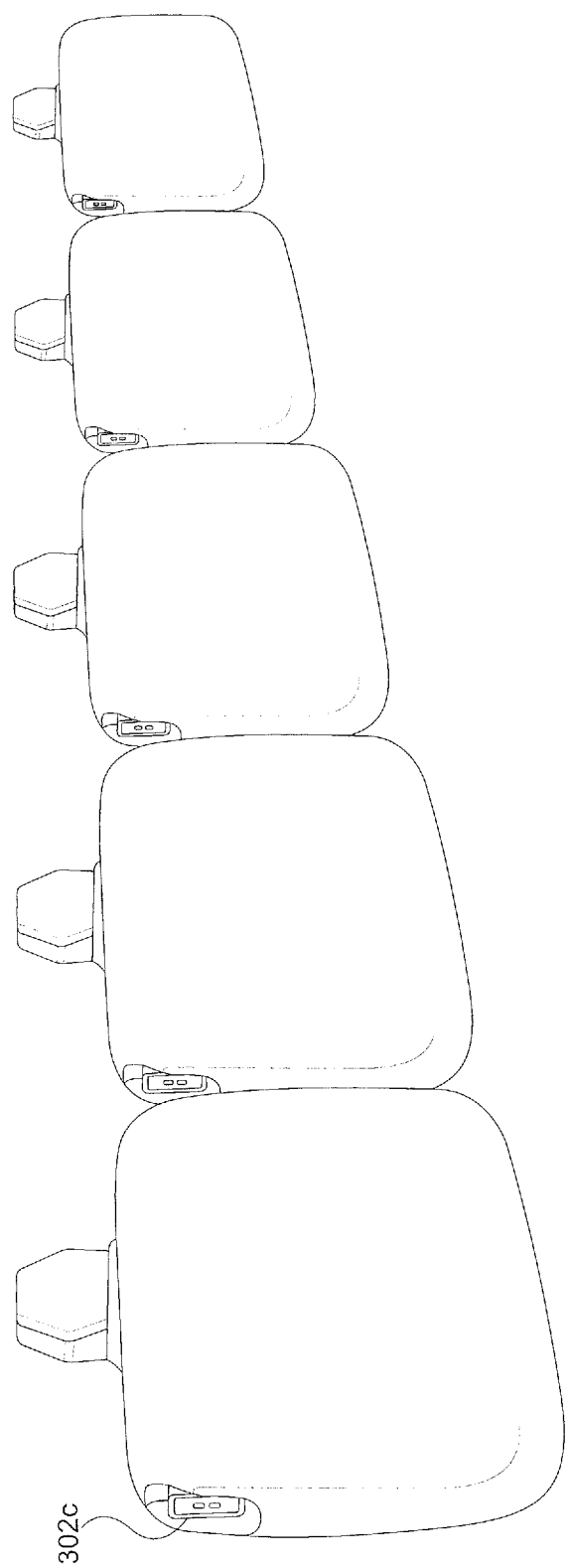
Figure 14:
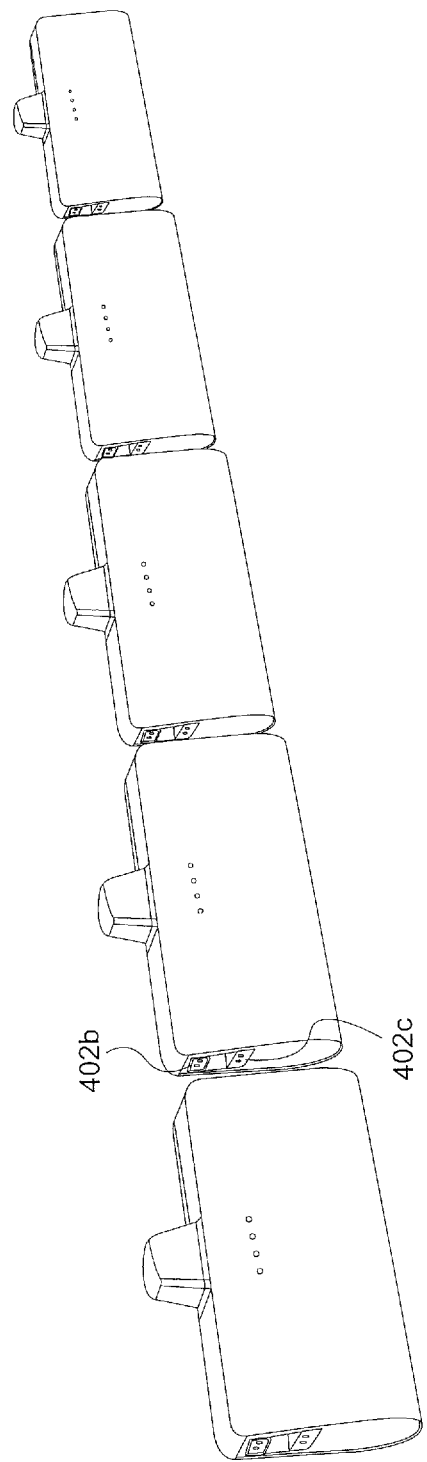
FIGS. 14-17 illustrate portable charging devices in accordance with an embodiment of the invention.

Referring to FIGS. 11-13, in another embodiment of the portable charging device, the above-described release button 312 is shown. The button 312 is activated (e.g., pressed or slid in a particular direction) to cause a spring loaded mechanism to have the connector 302b, 302c and/or the connector (not shown) under cap 304 spring out of its corresponding recess. The portable charging devices in FIG. 11-13 include a plurality of female connectors 313 similar in function to female connector 103 and configured to receive different types of male connectors.

Referring to FIGS. 14-17, in another embodiment of the portable charging device, the above-described release button 412 is shown. The button 412 is activated (e.g., pressed or slid in a particular direction) to cause a spring loaded mechanism to have the connector 402a, 402b and/or 402c spring out of its corresponding recess. As can be seen in the device in FIGS. 14-17, the two reserve connectors 402b and 402c are positioned in recesses on the same side of the device.

Figure 15:
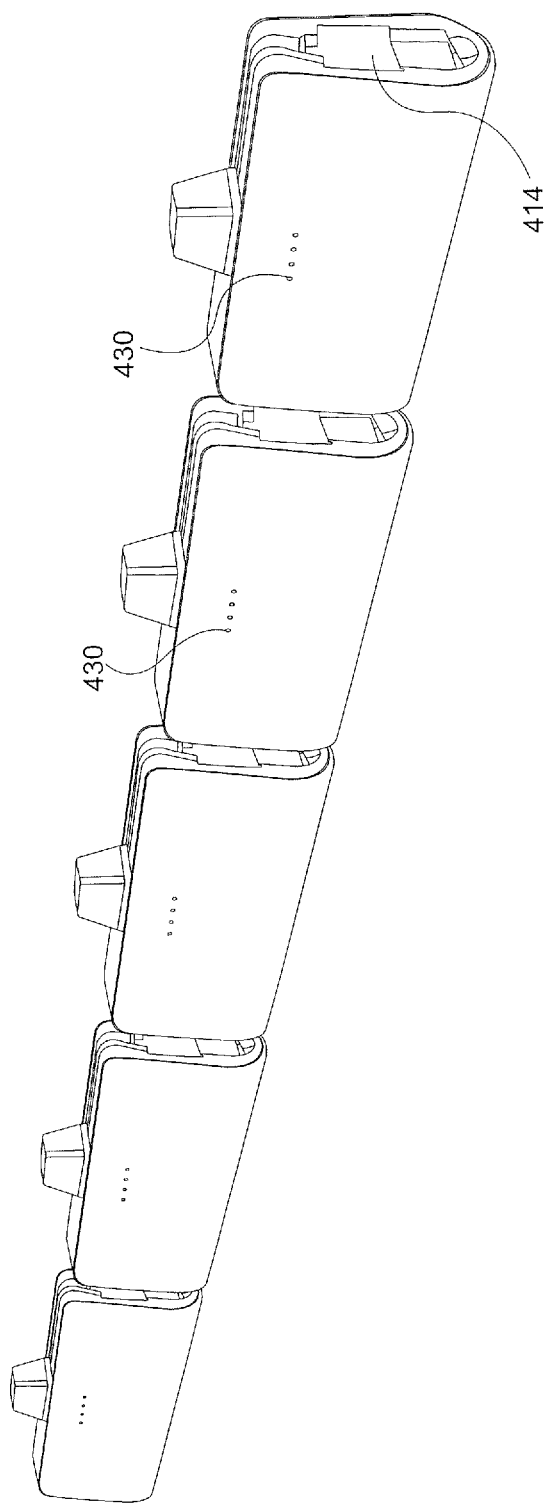

Referring to FIG. 15, each of the devices includes a USB plug 414 to connect to a USB receptacle on a device (e.g., computer) or in a plug that can be inserted into a standard household outlet providing 15 amperes (amps) of current and 120 volts. The batteries of the devices in FIG. 15 are able to be charged via their respective USB plugs 414 when the plugs 414 are connected to a power source via a USB receptacle on a device (e.g., computer) or in a plug that can be inserted into a standard household outlet.

Similar to the device 100 in FIGS. 1-6, the devices in FIGS. 11-13 and 14-17 each include a plurality of LEDs 330 and 430 on a surface of their respective housings. The LEDs 330 and 430 are electrically connected to a PCBA in their respective housings and are connected to circuitry in the PCBA to enable the LEDs 330 and 430 to indicate a charge status of the battery in their respective housings. For example, the charge status of the batteries can be indicated by a number of the LEDs 330 and 430 that are lit at a given time and/or by the color of the LEDs.

FIGS. 18-35 and FIGS. 36-45 show respective additional embodiments of the portable charging device comprising removable and interchangeable connectors and enlarged views of their respective components. Referring to FIGS. 18-35 and FIGS. 36-45, portable charging devices 500 and 600 include housing portions 501a and 501b, and 601a and 601b, respectively. The device 500 includes a plurality of removable and interchangeable connectors 502a, 502b and 502c, and the device 600 includes a plurality of removable and interchangeable connectors 602a, 602b and 602c. The connectors 502a/602a, 502b/602b and 502c/602c respectively include upper portions U comprising a male connecting element on base portions B. In the device 500, connectors 502b and 502c are positioned in an eject box 513 on a side of the device 500, while connector 502a is positioned in a recess 505 in a housing 510. Part of the base portion B is positioned in the recess 505. In an alternative embodiment, all of the base portion B is positioned in the recess 505. The arrows on the connectors 502a/602a, 502b/602b and 502c/602c in FIGS. 22, 27, 28, 39 and 40 illustrate the direction of insertion of the connectors 502a/602a, 502b/602b and 502c/602c into the recesses 505/605.

Two spring or material memory loaded elements 521 and 522 respectively push out the connectors 502b and 502c from the device 500 when, for example, the connectors 502b and 502c are pushed inward into the device 500. The inward force on the connectors 502b and 502c causes the two spring or material memory loaded elements 521 and 522 to react with opposite force to push out the connectors 502b and 502c from the device 500. In another embodiment, in the device 600, the connectors 602b and 602c sit in recesses 606 and 607 of a housing 610. The connectors 602b and 602c are on top a side portions of the device 600 and sit perpendicular or substantially perpendicular to each other. The connector 602a is positioned in a recess 605 in a housing 610. Part of the base portion B is positioned in the recess 605. In an alternative embodiment, all of the base portion B is positioned in the recess 605.

The connectors 502a and 602a positioned in the recesses 505 and 605 are electrically connected to a battery 523 of the device 500 and a battery 623 of the device 600 to charge a personal electronic device (e.g., a mobile phone, smartphone, tablet computer, etc.) connected to the portable charging devices 500 and 600 via the connectors 502a and 602a. The connectors 502b and 502c and 602b and 602c are reserve/alternate connectors, which can replace the connectors 502a and 602a respectively positioned in the recesses 505 and 605. The reserve connectors can be different types of connectors from the connector in the recess (e.g., male micro-universal serial bus (USB) connector, a male USB-mini connector, a male USB-C connector, a male lightning (Apple®) connector or other type of portable device connector) so as to charge a differently configured personal electronic device (e.g., iPhone vs. Android phone) or may be the same type of connector as the connector in the recesses 505 and 605 to replace the connector in the recesses 505 and 605 if that connector breaks or fails to operate. As can be seen in FIGS. 2-5, the connector 102a is removed from the recess 105 and replaced by the connector 102b, which is removed from the recess 106 and inserted into the recess 105. Each of the connectors 502a, 502b and 502c can be interchanged with each other to occupy the same portions of the device 500 as the other connectors. Each of the connectors 602a, 602b and 602c can be interchanged with each other to occupy the same portions of the device 600 as the other connectors.

In the device 500, a rechargeable battery 523 is disposed between housing portions 501a and 501b, and is electrically connected to the connector 502a in the recess 505 via leads 515 on a PCBA 526. Similarly, in the device 600, a rechargeable battery 623 is disposed between housing portions 601a and 601b, and is electrically connected to the connector 602a in the recess 605 via leads 615 on a PCBA 626. The connectors 502a/602a, 502b/602b and 502c/602c are configured for being inserted into a female connector of a second electronic device, including but not necessarily limited to, a mobile phone, smartphone or a tablet. The second electronic device is charged via the battery 523 or 623 when connected to the portable charging device 500 or 600 via one of the connectors 502a/602a, 502b/602b and 502c/602c in the recess 505 or 605. A connecting piece 511 or 611 is positioned between the PCBA 526/626 and the housing 510/610 to secure a connector 502a/602a, 502b/602b or 502c/602c in the recess 505/605.

Each of the devices 500 and 600 includes a USB plug 514/614 to connect to a USB receptacle on a device (e.g., computer) or in a plug that can be inserted into a standard household outlet providing 15 amperes (amps) of current and 120 volts. The batteries 523/623 of the devices 500/600 are able to be charged via their respective USB plugs 514/614 when the plugs 514/614 are connected to a power source via a USB receptacle on a device (e.g., computer) or in a plug that can be inserted into a standard household outlet. The plugs are connected to the batteries 523/623 via PCBAs 526/626.

In operation, when the second electronic device (e.g., smartphone, tablet or other rechargeable portable personal electronic device) is connected to the devices 500/600 via one of the connectors 502a/602a, 502b/602b or 502c/602c in the recess 505/605, the devices 500 and 600 via the PCBA 526/626, are configured for having the batteries 523/623 charge a battery of the connected second electronic device.

In addition, as described above, a power source can be connected to the devices via the USB plug 514/614. The power source (e.g., from a wall outlet or other device) can be connected to the devices 500/600 while the second electronic device is connected to the devices 500/600 via one of the connectors 502a/602a, 502b/602b or 502c/602c and charging. The device is configured via the PCBAs 526/626 to have pass through technology, such that using the power source, the batteries 523/623 in the devices 500 and 600 can be recharging while a connected second device is also being charged.

According to an embodiment, the PCBAs 526/626 include load balancing circuitry and power regulating circuits to transfer power from the power source to the batteries 523/623 in the devices 500/600 and to the connected second device. As can be understood, the devices 500/600 are portable charging devices that can be used to charge other devices while not connected to (e.g., plugged into) a power source, or while connected to (plugged into) a power source.

In an embodiment, the portable charging devices 500/600 maintain portability features such that, in a non-limiting example, the portable charging devices 500/600 are small enough to fit in one's pocket for storage. Caps 504/604 can be used to cover and protect the connectors in the recesses 505/605.

Like the connectors 102, 202, 302 and 402, the connectors 502a/602a, 502b/602b or 502c/602c include electrical recesses (e.g., recesses 625) on a bottom side of the base portion B for connecting to electrical contacts 515 and 615 at the base of the recesses 505 and 605 when the connectors 502a/602a, 502b/602b or 502c/602c are inserted into the recess 505/605.

The connectors 502a, 502b and 502c and the connectors 602a, 602b and 602c also comprise one or more recesses 517/617 on one or more sides of their respective base portions B to engage spring or material memory loaded protrusions 509/609 on connecting pieces 511/611 while in the recesses 505/605 for securing the connectors 502a/602a, 502b/602b or 502c/602c in the recesses 505/605. Release buttons 512/612 release the connectors 502a/602a, 502b/602b or 502c/602c from the recesses 505/605. The buttons 512/612 are activated (e.g., pressed or slid in a particular direction) to cause loaded protrusions 509/609 on connecting pieces 511/611 to disengage from the recesses 517/617 to have the connectors 502a/602a, 502b/602b or 502c/602c in the recesses 505/605 spring out of the recesses 505/605.

Figure 46:
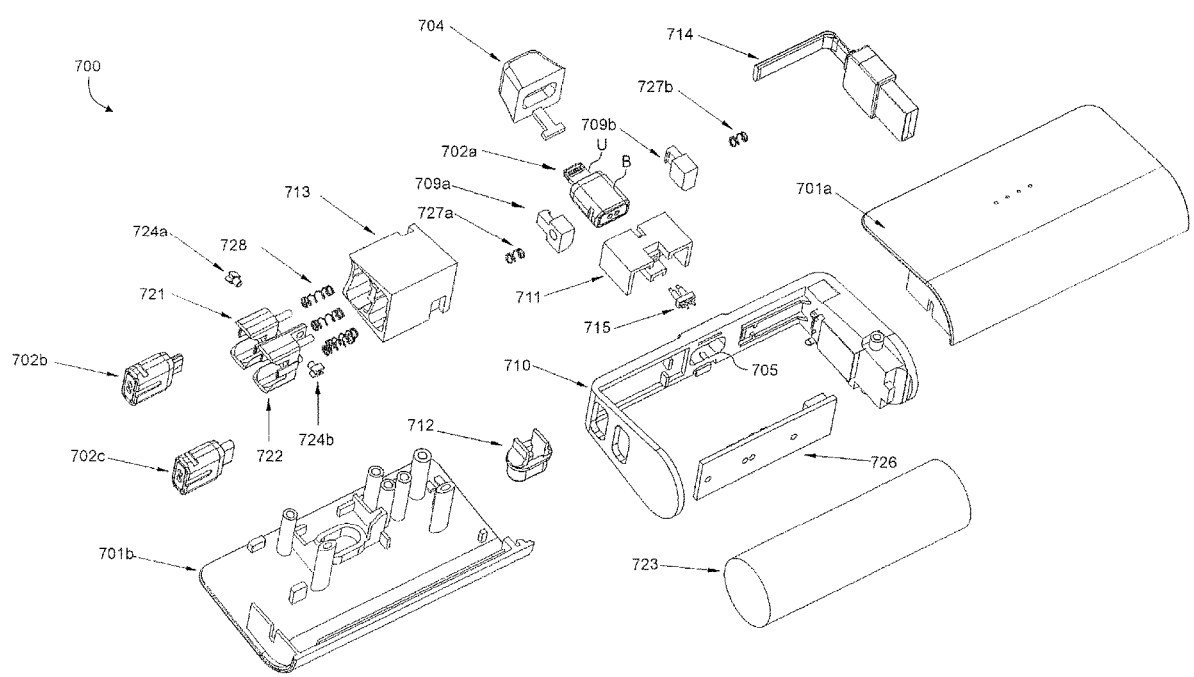
FIG. 46 illustrates an exploded view of portable charging device in accordance with an embodiment of the invention.
Figure 47:
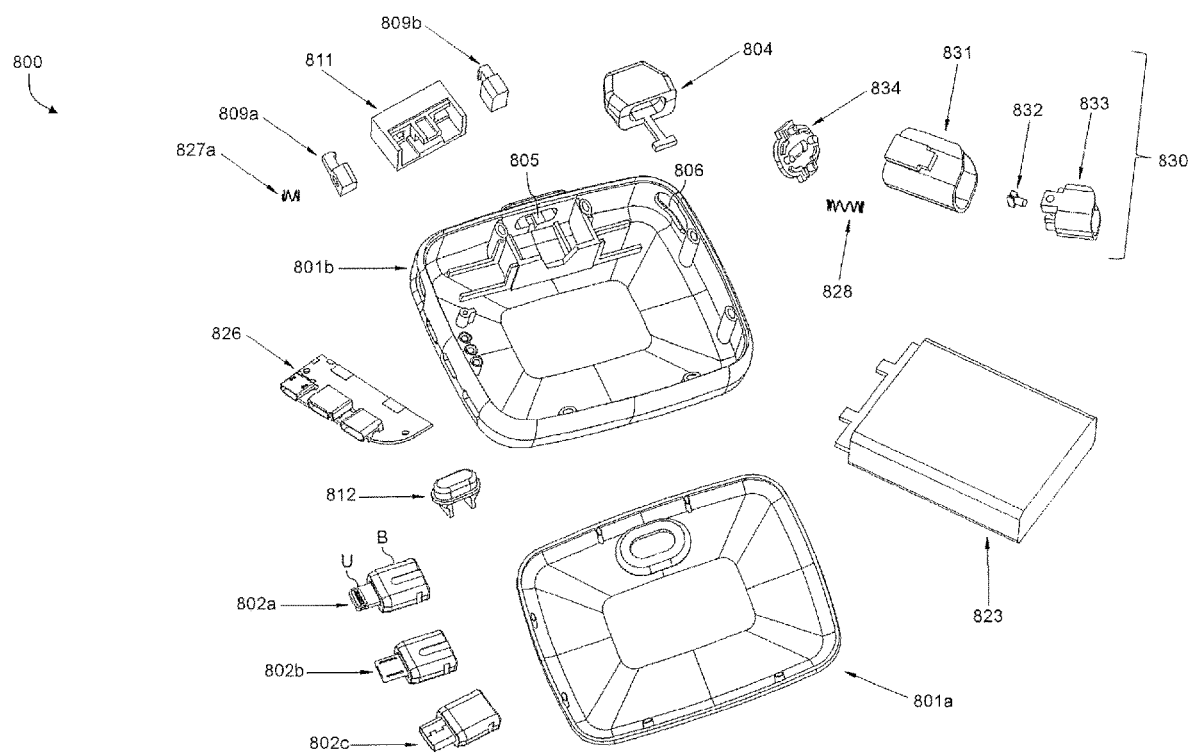
FIG. 47 illustrates an exploded view of portable charging device in accordance with an embodiment of the invention.

FIG. 46 and FIG. 47 show respective additional embodiments of the portable charging device comprising removable and interchangeable connectors. Referring to FIG. 46 and FIG. 47, portable charging devices 700 and 800 include housing portions 701a and 701b, and 801a and 801b, respectively. The device 700 includes a plurality of removable and interchangeable connectors 702a, 702b and 702c, and the device 800 includes a plurality of removable and interchangeable connectors 802a, 802b and 802c. The connectors 702a/802a, 702b/802b and 702c/802c respectively include upper portions U comprising a male connecting element on base portions B. In the device 700, connectors 702b and 702c are positioned in an eject box 713 on a side of the device 700, while connector 702a is positioned in a recess 705 in a housing 710. Part of the base portion B is positioned in the recess 705. In an alternative embodiment, all of the base portion B is positioned in the recess 705.

Two spring loaded elements 721 and 722 (loaded by springs 728) respectively push out the connectors 702b and 702c from the device 700 when, for example, the connectors 702b and 702c are pushed inward into the device 500. The inward force on the connectors 702b and 702c causes the two spring loaded elements 721 and 722 to react with opposite force to push out the connectors 702b and 702c from the device 700. The elements 721 and 722 are secured to each other by locking parts 724a and 724b. In another embodiment, in the device 800, the connector 802b or 802c sits in a spring-loaded push-out part 830 comprising portions 831, 832, 833 and 834. The push-out part is loaded by spring 828 and is positioned adjacent recess 806 of a housing 801b. The connector 802a is positioned in a recess 805 in a housing 801b. Part of the base portion B is positioned in the recess 805. In an alternative embodiment, all of the base portion B is positioned in the recess 805.

The connectors 702a and 802a positioned in the recesses 705 and 805 are electrically connected to a battery 723 of the device 700 and a battery 823 of the device 800 to charge a personal electronic device (e.g., a mobile phone, smartphone, tablet computer, etc.) connected to the portable charging devices 700 and 800 via the connectors 702a and 802a. The connectors 702b and 702c and 802b and 802c are reserve/alternate connectors, which can replace the connectors 702a and 802a respectively positioned in the recesses 705 and 805. The reserve connectors can be different types of connectors from the connector in the recess (e.g., male micro-universal serial bus (USB) connector, a male USB-mini connector, a male USB-C connector, a male lightning (Apple®) connector or other type of portable device connector) so as to charge a differently configured personal electronic device (e.g., iPhone vs. Android phone) or may be the same type of connector as the connector in the recesses 705 and 805 to replace the connector in the recesses 705 and 805 if that connector breaks or fails to operate. As can be seen in FIGS. 2-5, the connector 102a is removed from the recess 105 and replaced by the connector 102b, which is removed from the recess 106 and inserted into the recess 105. Each of the connectors 702a, 702b and 702c can be interchanged with each other to occupy the same portions of the device 700 as the other connectors. Each of the connectors 802a, 802b and 802c can be interchanged with each other to occupy the same portions of the device 800 as the other connectors.

In the device 700, a rechargeable battery 723 is disposed between housing portions 701a and 701b, and is electrically connected to the connector 702a in the recess 705 via leads 715 electrically coupled to PCBA 726. The leads 715 may comprise, for example, contact pins, which are positioned in pin stand 711. The leads 715 may be physically coupled to the PCBA 726. Similarly, in the device 800, a rechargeable battery 823 is disposed between housing portions 801a and 801b, and is electrically connected to the connector 802a in the recess 805 via leads (not shown) electrically coupled to a PCBA 826. The connectors 702a/802a, 702b/802b and 702c/802c are configured for being inserted into a female connector of a second electronic device, including but not necessarily limited to, a mobile phone, smartphone or a tablet. The second electronic device is charged via the battery 723 or 823 when connected to the portable charging device 700 or 800 via one of the connectors 702a/802a, 702b/802b and 702c/802c in the recess 705 or 805. A plug hub 811 secures a connector 802a, 802b or 802c in the recess 805.

The device 700 includes a USB plug 715 to connect to a USB receptacle on a device (e.g., computer) or in a plug that can be inserted into a standard household outlet providing 15 amperes (amps) of current and 120 volts. The battery 723 of the device 700 is able to be charged via the USB plugs 714 when the plug 714 is connected to a power source via a USB receptacle on a device (e.g., computer) or in a plug that can be inserted into a standard household outlet. The plug 714 is connected to the battery 723 via PCBA 726.

In operation, when the second electronic device (e.g., smartphone, tablet or other rechargeable portable personal electronic device) is connected to the devices 700/800 via one of the connectors 702a/802a, 702b/802b or 702c/802c in the recess 705/805, the devices 700 and 800 via the PCBA 726/826, are configured for having the batteries 723/823 charge a battery of the connected second electronic device.

In addition, as described above, a power source can be connected to the devices 700/800. The power source (e.g., from a wall outlet or other device) can be connected to the devices 700/800 while the second electronic device is connected to the devices 700/800 via one of the connectors 702a/802a, 702b/802b or 702c/802c and charging. The device is configured via the PCBAs 726/826 to have pass through technology, such that using the power source, the batteries 723/823 in the devices 700 and 800 can be recharging while a connected second device is also being charged.

According to an embodiment, the PCBAs 726/826 include load balancing circuitry and power regulating circuits to transfer power from the power source to the batteries 723/823 in the devices 700/800 and to the connected second device. As can be understood, the devices 700/800 are portable charging devices that can be used to charge other devices while not connected to (e.g., plugged into) a power source, or while connected to (plugged into) a power source.

In an embodiment, the portable charging devices 700/800 maintain portability features such that, in a non-limiting example, the portable charging devices 700/800 are small enough to fit in one's pocket for storage. Caps 704/804 can be used to cover and protect the connectors in the recesses 705/805.

Like the connectors 102, 202, 302 and 402, the connectors 702a/802a, 702b/802b or 702c/802c include electrical recesses on a bottom side of the base portion B for connecting to electrical contacts (e.g., contact 715) at the base of the recesses 705 and 805 when the connectors 702a/802a, 702b/802b or 702c/802c are inserted into the recess 705/805.

The connectors 702a, 702b and 702c and the connectors 802a, 802b and 802c also comprise one or more recesses (the same or similar to recesses 517 and 617) on one or more sides of their respective base portions B to engage spring loaded protrusions 709a/809a and 709b/809b and loaded by one or more springs 727a and 727b (FIG. 7) or spring 827a (FIG. 8) while in the recesses 705/805 for securing the connectors 702a/802a, 702b/802b or 702c/802c in the recesses 705/805.

Release buttons 712/812 release the connectors 702a/802a, 702b/802b or 702c/802c from the recesses 705/805. The buttons 712/812 are activated (e.g., pressed or slid in a particular direction) to cause loaded protrusions 509/609 on connecting pieces 511/611 spring loaded protrusions 709a/809a and 709b/809b to disengage from the recesses on the sides of the connectors 702a/802a, 702b/802b or 702c/802c to have the connectors 702a/802a, 702b/802b or 702c/802c in the recesses 705/805 spring out of the recesses 705/805.

The devices in FIGS. 1-47 can include male and female connectors for both Android® and Apple® portable devices. In accordance with one or more embodiments, the battery in the devices in FIGS. 1-47 is configured to be recharged with suitable power requirements, such as, by non-limiting example, recharging with at least 5V and 1.3 A, which would recharge the battery in approximately 75 minutes. Such a capability allows the portable recharging devices to be reused multiple times, such as, for example, over 1,000 times.

According to one or more embodiments, the battery in the devices in FIGS. 1-47 has a capacity to fully recharge the battery of a connected electronic device. By non-limiting example, the battery of the portable charging devices can be 1800 mAh-3600 mAh. The battery is configured to recharge an electronic device with suitable power requirements, such as, by non-limiting example, with the portable recharging device 100 outputting at least 5V and 1.7 A.

Although exemplary embodiments of the present invention have been described hereinabove, it should be understood that the present invention is not limited to these embodiments, but may be modified by those skilled in the art without departing from the spirit and scope of the present invention.

What is claimed is:

1. An electronic device, comprising:
   a housing;
   a removable connector comprising a base portion and an upper portion on the base portion, wherein the upper portion comprises a male connecting element for connecting to a second electronic device;
   a recess in the housing accommodating at least part of the removable connector, wherein:
   at least part of the base portion is positioned in the recess; and
   the base portion comprises one or more recesses on one or more sides of the base portion engaging one or more protrusions in the recess when at least the part of the base portion is positioned in the recess;
   a battery configured for charging a battery of the second electronic device via the removable connector when at least the part of the base portion is positioned in the recess, and the male connecting element is coupled to the second electronic device; and
   a release button connected to the one or more protrusions so that when activated, the release button releases the one or more protrusions from engagement with the one or more recesses.

2. The electronic device according to claim 1, wherein the male connecting element comprises one of a male micro-USB connector, a male USB-mini connector, a male USB-C connector, and a male lightning connector.

3. The electronic device according to claim 1, wherein:
   the recess comprises one or more electrical contacts at a base of the recess; and
   the base portion of the removable connector comprises one or more electrical recesses receiving the one or more electrical contacts when at least the part of the base portion is positioned in the recess.

4. The electronic device according to claim 3, wherein the one or more electrical recesses are positioned on a bottom side of the base portion.

5. The electronic device according to claim 1, further comprising a storage recess in the housing in which an additional removable connector is positioned, wherein the additional removable connector comprises a different type male connecting element than the removable connector.

6. The electronic device according to claim 5, wherein the recess receives at least part of the additional removable connector in place of the removable connector.

7. The electronic device according to claim 6, wherein the battery is configured for charging the battery of the second electronic device via the additional removable connector when at least the part of the additional removable connector is positioned in the recess.

8. The electronic device according to claim 5, wherein the recess is positioned at a top surface of the electronic device, and the storage recess is positioned a side surface of the device adjacent the top surface.

9. A removable connector for an electronic device, comprising:
   a base portion comprising one or more electrical recesses positioned on a bottom side of the base portion; and
   an upper portion on the base portion and comprising a male connecting element for connecting to a second electronic device, wherein:
   the base portion is insertable into a recess of the electronic device;
   the base portion further comprises one or more recesses on one or more sides of the base portion adjacent the bottom side of the base portion, the one or more recesses engaging one or more protrusions in the recess when at least part of the base portion is inserted in the recess; and
   a release button is connected to the one or more protrusions so that when activated, the release button releases the one or more protrusions from engagement with the one or more recesses.

10. The removable connector according to claim 9, wherein the male connecting element comprises one of a male micro-USB connector, a male USB-mini connector, a male USB-C connector, and a male lightning connector.

11. A method, comprising:
   inserting a removable connector into a recess in a housing of an electronic device;
   wherein the removable connector comprises a base portion and an upper portion on the base portion;
   wherein at least part of the base portion is inserted into the recess;
   wherein the base portion comprises one or more recesses on one or more sides of the base portion engaging one or more protrusions in the recess when at least the part of the base portion is inserted in the recess; and
   wherein the upper portion comprises a male connecting element for connecting to a second electronic device;
   connecting the male connecting element to the second electronic device;
   charging a battery of the second electronic device via the electronic device and the removable connector;
   activating a release button connected to the one or more protrusions to release the one or more protrusions from engagement with the one or more recesses; and removing the removable connector from the recess in the housing.

12. The method according to claim 11, wherein the male connecting element comprises one of a male micro-USB connector, a male USB-mini connector, a male USB-C connector, and a male lightning connector.

13. The method according to claim 11, wherein:
the recess comprises one or more electrical contacts at a base of the recess; and
the base portion comprises one or more electrical recesses receiving the one or more electrical contacts when at least the part of the base portion is inserted in the recess.

14. The method according to claim 11, further comprising storing an additional removable connector in a storage recess in the housing, wherein the additional removable connector comprises a different type male connecting element than the removable connector.

15. The method according to claim 14, further comprising:
removing the removable connector from the recess in the housing;
removing the additional removable connector from the storage recess;
replacing the removable connector with the additional removable connector in the recess; and
replacing the additional removable connector with the removable connector in the storage recess.

16. The removable connector according to claim 9, wherein a battery of the second electronic device is charged via the removable connector.

17. The removable connector according to claim 9, wherein a battery of the second electronic device is charged via the removable connector when at least the part of the base portion is inserted in the recess, and the male connecting element is connected to the second electronic device.

* * * * *